US011368089B2

(12) United States Patent
Chakraborty et al.

(10) Patent No.: US 11,368,089 B2
(45) Date of Patent: Jun. 21, 2022

(54) INTERLEAVED MULTI-LEVEL CONVERTER

(71) Applicant: TEXAS INSTRUMENTS INCORPORATED, Dallas, TX (US)

(72) Inventors: Sombuddha Chakraborty, Redwood City, CA (US); Hakan Oner, San Jose, CA (US); Yogesh Kumar Ramadass, San Jose, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/840,087

(22) Filed: Apr. 3, 2020

(65) Prior Publication Data

US 2021/0313891 A1 Oct. 7, 2021

(51) Int. Cl.
*H02M 3/158* (2006.01)
*H02M 1/00* (2006.01)
(Continued)

(52) U.S. Cl.
CPC ....... *H02M 3/1584* (2013.01); *H02M 1/0043* (2021.05); *H02M 7/4837* (2021.05); *H02M 3/157* (2013.01); *H02M 3/1586* (2021.05)

(58) Field of Classification Search
CPC .. H02M 3/1586; H02M 1/0043; H02M 7/493; H02M 3/07; H02M 7/4833; H02M 1/0095; H02M 3/1584; H02M 7/4837
See application file for complete search history.

(56) References Cited

U.S. PATENT DOCUMENTS 10,090,763 B1 10/2018 Mercer et al.
10,615,697 B1 * 4/2020 Ferrari ............... H02M 3/1584
(Continued)

FOREIGN PATENT DOCUMENTS

EP 2869452 A1 6/2015
KR 20160149454 A 12/2016
WO 2015108613 A1 7/2015

OTHER PUBLICATIONS

Kiani, M. Hassan et al. "Optimization and Comparison of Hybrid-Resonant Switched Capacitor DC-DC Converter Topologies." 2017 IEEE 18th Workshop on Control and Modeling for Power Electronics (COMPEL). Stanford, CA. Jul. 9-12, 2017, 8 pages.
(Continued)

*Primary Examiner* — Alex Torres-Rivera
(74) *Attorney, Agent, or Firm* — Valerie M. Davis; Charles A. Brill; Frank D. Cimino

(57) ABSTRACT

Described systems, methods, and circuitries use an interleaved multi-level converter to convert an input signal received at an input node into an output signal at an output node. In one example, a power conversion system includes a first multi-level switching circuit, a second multi-level switching circuit, and a control circuit. The first multi-level switching circuit and the second multi-level switching circuit are coupled to a switching node, the input node, and a reference node. The control circuit is configured to generate, based on the output signal, switching control signals as pulse width modulated signals having a duty cycle to control the output signal and provide the switching control signals to the first multi-level switching circuit and the second multi-level switching circuit.

20 Claims, 18 Drawing Sheets

(51) Int. Cl.
 *H02M 7/483* (2007.01)
 *H02M 3/157* (2006.01)

(56) References Cited

U.S. PATENT DOCUMENTS

| | | | |
|---|---|---|---|
| 2016/0268924 A1* | 9/2016 | Fu | H02M 7/4837 |
| 2017/0310242 A1* | 10/2017 | Kifuji | H02M 7/4833 |
| 2019/0028031 A1 | 1/2019 | Scoones et al. | |
| 2019/0058385 A1 | 2/2019 | Lazaro et al. | |
| 2019/0058397 A1 | 2/2019 | Lazaro et al. | |
| 2019/0334433 A1* | 10/2019 | Woo | H02M 3/158 |
| 2020/0395852 A1* | 12/2020 | Yoo | H02M 3/1584 |

OTHER PUBLICATIONS

PCT Search Report and Written Opinion dated Jul. 8, 2021.

\* cited by examiner

INTERLEAVED MULTI-LEVEL CONVERTER

BACKGROUND

High efficiency power supplies are desirable for battery-operated systems, including mobile phones, tablets, laptops and other devices. Buck, boost, and other DC/DC convertors use high and low side drivers to alternately connect a switching node to the input voltage or ground. As a result, the high and low side drivers are sized to withstand the input voltage level, and suffer from switching losses. Multi-level switching converter circuits use more switching stages and one or more flying capacitors, resulting in reduced switching loss and higher effective switching frequency. Multi-level switching converters enable the use of lower rated power devices that are not necessarily rated for the input voltage level, and the individual power devices in the converter can be run at a reduced frequency as compared to dual level converters, even while achieving a higher overall switching frequency.

SUMMARY

In one example, a power conversion system includes a first multi-level switching circuit, a second multi-level switching circuit, an inductor, and a control circuit. The first multi-level switching circuit is coupled to a switching node, the input node, and a reference node. The second multi-level switching circuit is coupled to the switching node, the input node, and the reference node, so the second multi-level switching circuit is arranged in parallel with the first multi-level switching circuit. The inductor is coupled between the switching node and the output node. The control circuit is configured to generate, based on the output signal, switching control signals as pulse width modulated signals having a duty cycle to control the output signal and provide the switching control signals to the first multi-level switching circuit and the second multi-level switching circuit.

In one example, a method to convert an input signal received at an input node into an output signal at an output node includes: providing the input signal to a first multi-level switching circuit coupled to a switching node, the input node, and a reference node; providing the input signal to a second multi-level switching circuit coupled to the switching node, the input node, and the reference node, so the second multi-level switching circuit is arranged in parallel with the first multi-level switching circuit; measuring the output signal; generating, based on the output signal, switching control signals as pulse width modulated signals having a duty cycle to control the output signal; and providing the switching control signals to the first multi-level switching circuit and the second multi-level switching circuit.

In one example, an integrated circuit includes a first multi-level switching circuit and a second multi-level switching circuitry coupled to a switching node, an input node, and a reference node, so the second multi-level switching circuit is arranged in parallel with the first multi-level switching circuit. Each of the first multi-level switching circuit and the second multi-level switching circuit includes a set of switches controlled by the switching control signals, the set of switches including a first switch coupled between the input node and a first internal node, a second switch coupled between the first internal node and the switching node, a third switch coupled between the switching node and a second internal node, and a fourth switch coupled between the second internal node and the reference node. Each of the first multi-level switching circuit and the second multi-level switching circuit includes a first capacitor connection feature coupled to the first internal node and a second capacitor connection feature coupled to the second internal node. The integrated circuit includes an inductor connection coupled to the switching node.

DETAILED DESCRIPTION

Figure 1:
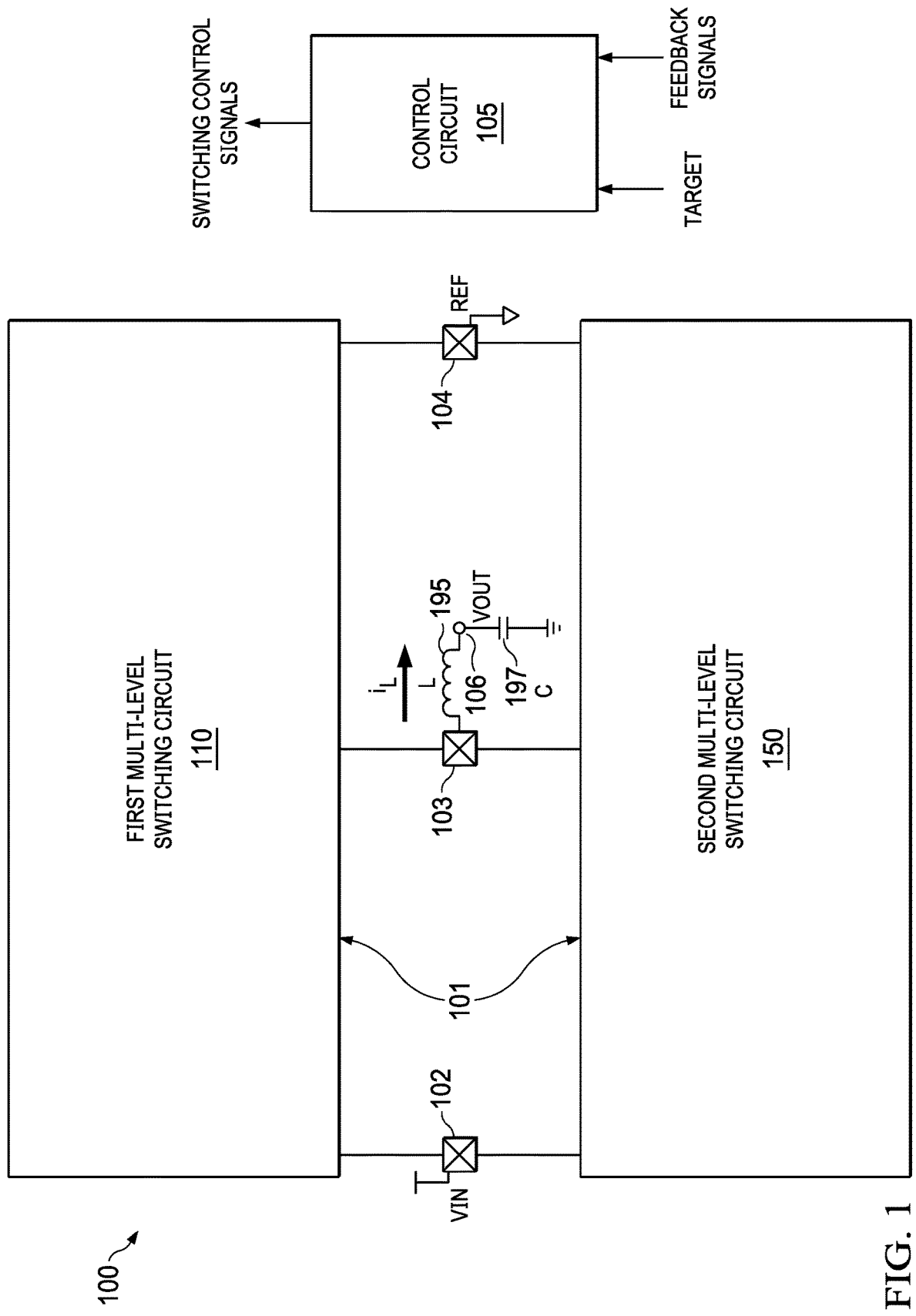
FIG. 1 is a block diagram of a power conversion system that includes an interleaved multi-level converter, according to one aspect of this description.

The drawings are not necessarily drawn to scale.

Multi-level converters exhibit many benefits including higher effective switching frequency, reduced switching losses, and an output current with less ripple. However, multi-level converters present design challenges in regulating the flying capacitor voltage and, because the input current is switched at half the switching frequency, multi-level converters may exhibit a tone for input current conducted electromagnetic interference (EMI) at one half of the switching frequency.

To overcome disadvantages described above, a power conversion system includes an interleaved multi-level converter having two parallel multi-level switching circuits. In the described architecture, the input current is switched at the same frequency as the switching frequency, which eliminates the half switching frequency tone concern for input current conducted EMI. The current density on the multi-stage converter components (besides the inductor) is halved. Radiated EMI is reduced due to the maximum voltage swing being reduced to half the input voltage as compared to a maximum voltage swing of the full input voltage in non-interleaved multi-level converters. The interleaved multi-level converter includes two multi-level switching circuits that share an input voltage node, a switch node, a reference node, and an inductor. The two multi-level power stages are driven by the same set of switching signals.

Throughout this description, components that are examples of a same or analogous component are assigned reference characters having the same value for the last two digits, while the initial digit(s) of reference characters are assigned based on the FIG. number in which they are first introduced.

FIG. 1 is a block diagram of a power conversion system 100 that includes an interleaved multi-level converter 101 and a control circuit 105. The power conversion system 100 is at least partially implemented on an integrated circuit (not shown for simplicity) that includes the interleaved multi-level converter 101 and the control circuit 105. The IC also includes an input node 102 (e.g., IC pin or pad) to receive an input signal, such as an input voltage signal VIN and a reference node 104 (e.g., tied to a ground or other reference voltage). The IC includes a switching node 103 (e.g., IC pin or pad) to deliver a switched signal, such as a voltage or current, generated by the interleaved multi-level converter 101 to an inductor 195. The inductor 195, which may or may not be implemented on the IC, is coupled to an output node 106 that is configured to be coupled to a load being powered by the power conversion system.

In this example, the power conversion system 100 is a DC/DC converter. When powered, the system 100 converts an input signal VIN at the input node 102 to provide an output signal VOUT at the output node 106. In one example, the system 100 operates to regulate the output signal according to a target signal or value that is provided to the control circuit 105. The target value can be an internal signal or can be provided to the control circuit 105 from an external source.

The multi-level interleaved converter 101 includes a first multi-level switching circuit 110 and a second multi-level switching circuit 150. Both the first multi-level switching circuit 110 and the second multi-level switching circuit 150 are coupled to the input node 102, the switching node 103, and the reference node 104. As will be described in more detail below, each of the multi-level switching circuits 110, 150 include switches, such as power transistors, coupled between the input node 102 and the reference node 104. The switches are controlled by switching control signals generated by the control circuit 105 based on feedback signals from the inductor 195 and/or output node 106 (e.g., the output signal). The switching control signals are pulse width modulated signals having a duty cycle that is selected by the control circuit 105 to bring the output signal into equivalence with the target signal. Certain aspects of an example control circuit related to balancing control of flying capacitors in the multi-level switching circuits will be described with reference to FIGS. 8-11.

Figure 2:
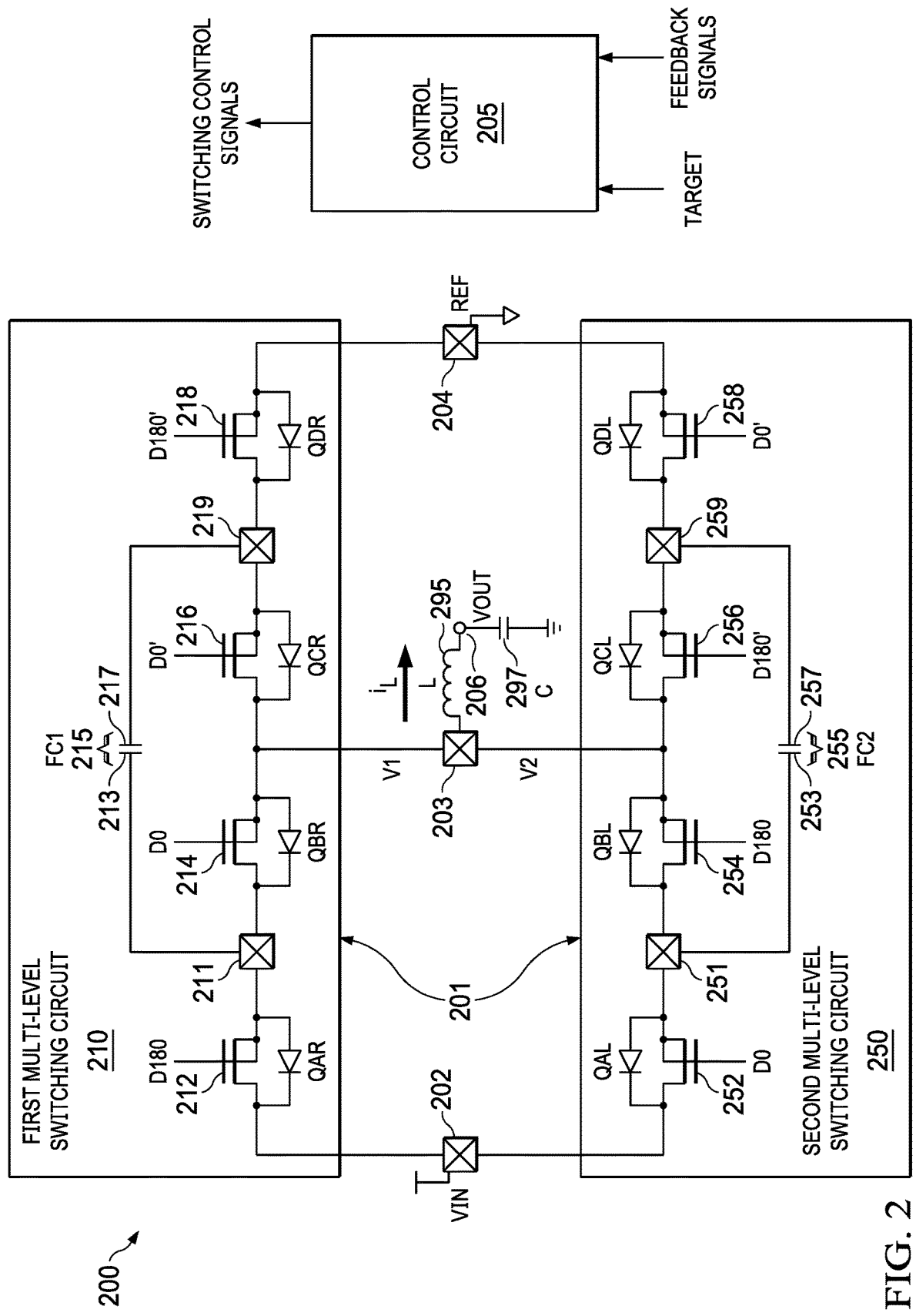
FIG. 2 is a circuit diagram of an interleaved multi-level converter, according to one aspect of this description.

FIG. 2 shows an example power conversion system 200, including an example implementation of an interleaved multi-level converter 201 and a control circuit 205. The interleaved multi-level converter 201 includes a first multi-level switching circuit 210 and a second multi-level switching circuit 250. The first multi-level switching circuit 210 is a three level converter that includes a first switch 212 (labeled QAR), a second switch 214 (labeled QBR), a third switch 216 (labeled QCR), and a fourth switch 218 (labeled QDR) that are series-coupled between an input node 202 and a reference node 204. These switches operate according to switching control signals D180, D0, D0', and D180' respectively, to provide a first voltage signal V1 to the switching node 203. In other examples, the first multi-level switching circuit 210 can include more or fewer switches to provide an N-level converter, where N is greater than 2. In this example, the switches 212, 214, 216 and 218 are power n-channel MOSFET (e.g., NMOS) transistors operative to turn on according to a corresponding active high switching control signal. In other examples, different types of switches may be used (e.g., PMOS, bipolar, IGBTs, and so on).

The first switch 212 of the first multi-level switching circuit 210 includes a drain coupled to the input node 202 and a source coupled to a first internal node 211. The second switch 214 of the first multi-level switching circuit 210 includes a drain coupled to the first internal node 211 and a source coupled to the switching node 203. The third switch 216 of the first multi-level switching circuit 210 includes a drain coupled to the switching node 203 and a source coupled to a second internal node 219. The fourth switch 218 of the first multi-level switching circuit 210 includes a drain coupled to the second internal node 219 and a source coupled to a reference node 204. The first multi-level switching circuit 210 also includes a capacitor 215, referred to herein as a flying capacitor (labeled FC1). The capacitor 215 includes a high side plate 213 coupled to the first internal node 211 and a low side plate 217 coupled to the second internal node 219. In one example, the IC includes the flying capacitor 215 as shown in FIG. 2. In another example, the IC includes capacitor connection features (e.g., pins or pads) (not shown) to allow connection of an external flying capacitor 215.

The second multi-level switching circuit 250 is a three level converter that includes a first switch 252 (labeled QAL), a second switch 254 (labeled QBL), a third switch 256 (labeled QCL), and a fourth switch 258 (labeled QDL) in a series circuit between the input node 202 and the reference node 204. These switches operate according to switching control signals D0, D180, D180' and D0' respectively, to provide a second voltage signal V2 to the switching node 203. In other examples, the second multi-level switching circuit 250 can include more or fewer switches to provide an N-level converter, where N is greater than 2. In this example, the number of levels in the first multi-level switching circuit 210 matches the number of levels in the second multi-level switching circuit 250. In this example, the switches 252, 254, 256, and 258 are power n-channel MOSFET (e.g., NMOS) transistors operative to turn on according to a corresponding active high switching control signal. In other examples, different types of switches may be used (e.g., PMOS, bipolar, IGBTs, and so on).

The first switch 252 of the second multi-level switching circuit 250 includes a drain coupled to the input node 202 and a source coupled to the first internal node 251. The second switch 254 of the second multi-level switching circuit 250 includes a drain coupled to a first internal node 251 and a source coupled to the switching node 203. The third switch 256 of the second multi-level switching circuit 250 includes a drain coupled to the switching node 203 and a source coupled to a second internal node 259. The fourth switch 258 of the second multi-level switching circuit 250 includes a drain coupled to the second internal node 259 and a source coupled to the reference node 204. The second multi-level switching circuit 250 also includes a flying capacitor 255 (labeled FC2). The flying capacitor 255 includes a high side plate 253 coupled to the first internal node 251 and a low side plate 257 coupled to the second internal node 259. In one example, the IC includes the flying capacitor 255 as shown in FIG. 2. In another example, the IC includes pins or pads (not shown) to allow connection of an external flying capacitor 255.

The output signals V1 and V2 from the multi-level switching circuits are provided to the inductor 295 coupled between the switching node 203 and an output node 206. In this example, the IC includes an externally accessible inductor connection feature or features (e.g., pins or pads) for connection to the terminals of the inductor 295, including a feature coupled to the switching node 203 and/or a feature coupled to the output node 206. In other examples, the IC may include the output node 202 and/or inductor 295. The configuration of the first multi-level switching circuit 210 and the second multi-level switching circuit 250 and the inductor 295 provides a buck-type DC/DC converter to provide a controlled output voltage VOUT at the output node 206 by converting input power from the input signal VIN. In this example, an output capacitor 297 (labeled C) is coupled between the output node 206 and the reference voltage. The output signal VOUT drives a load (not shown).

The control circuit 205 (which may be implemented as analog circuits, digital circuits, and/or firmware or software-executed program instructions) generates first switching control signal D0, second switching control signal D180, third switching control signal D0', and fourth switching control signal D180'. The first switching control signal D0 is 180 degrees out of phase with the second switching control signal D180. The third switching control signal D0' is an inversion of the first switching control signal D0. The fourth switching control signal D180' is an inversion of the second switching control signal D180. The control circuit 205 generates the switching control signals having a duty cycle that is based on the target signal and feedback signals including an inductor current $I_L$ (through inductor 295) and, in some examples, also flying capacitor voltages $V_{FC1}$ and $V_{FC2}$.

As shown in FIG. 2, in this example, the first switching control signal D0 controls the first switch 252 in the second multi-level switching circuit 250 and the second switch 214 in the first multi-level switching circuit 210. The second switching control signal D180 controls the first switch 212 in the first multi-level switching circuit 210 and the second switch 254 in the second multi-level switching circuit 250. The third switching control signal D0' controls the third switch 216 in the first multi-level switching circuit 210 and the fourth switch 258 in the second multi-level switching circuit 250. The fourth switching control signal D180' controls the third switch 256 in the second multi-level switching circuit 250 and the fourth switch 218 in the first multi-level switching circuit 210.

In this manner, the switching control signal sent to the first switch 212 is 180 degrees out of phase with the switching control signal sent to the first switch 252, and this relationship is true for each pair of corresponding switches in the first multi-level converter 210 and the second multi-level converter 250. Thus, the illustrated topology ensures that current is drawn from the input node 202 each time a D0 or D180 controlled switch (e.g. 212, 252) is activated. Although the D0 and D180 switching signals have half the frequency of the switching of the signal at the switching node 203, the input current draw is at the same frequency as at the switching node 203. This eliminates the EMI tone at half of the switching frequency experienced by other converters.

For proper operation, the voltages across flying capacitors 215 and 255 should be maintained at (or within some predetermined equivalence range of) VIN/2. The interleaved multi-level converter architecture illustrated in FIG. 2 allows the flying capacitors to "self-balance" (e.g., without additional control measures) to VIN/2 when a valley-type control scheme is used by the control circuit 205. This is because any deviation of the flying capacitor voltage from VIN/2 is counter-balanced by the dynamics of the valley current mode control forcing the allocated charge or discharge time of the flying capacitor to be corrected while maintaining the energizing and de-energizing current to the inductor. In this manner, VCMC provides an inherent negative feedback for flying capacitor voltage correction. However, when other control schemes (e.g., a peak-type control scheme) are used by the control circuit 205, additional measures should be taken to regulate the voltages across the flying capacitors.

Figure 3:
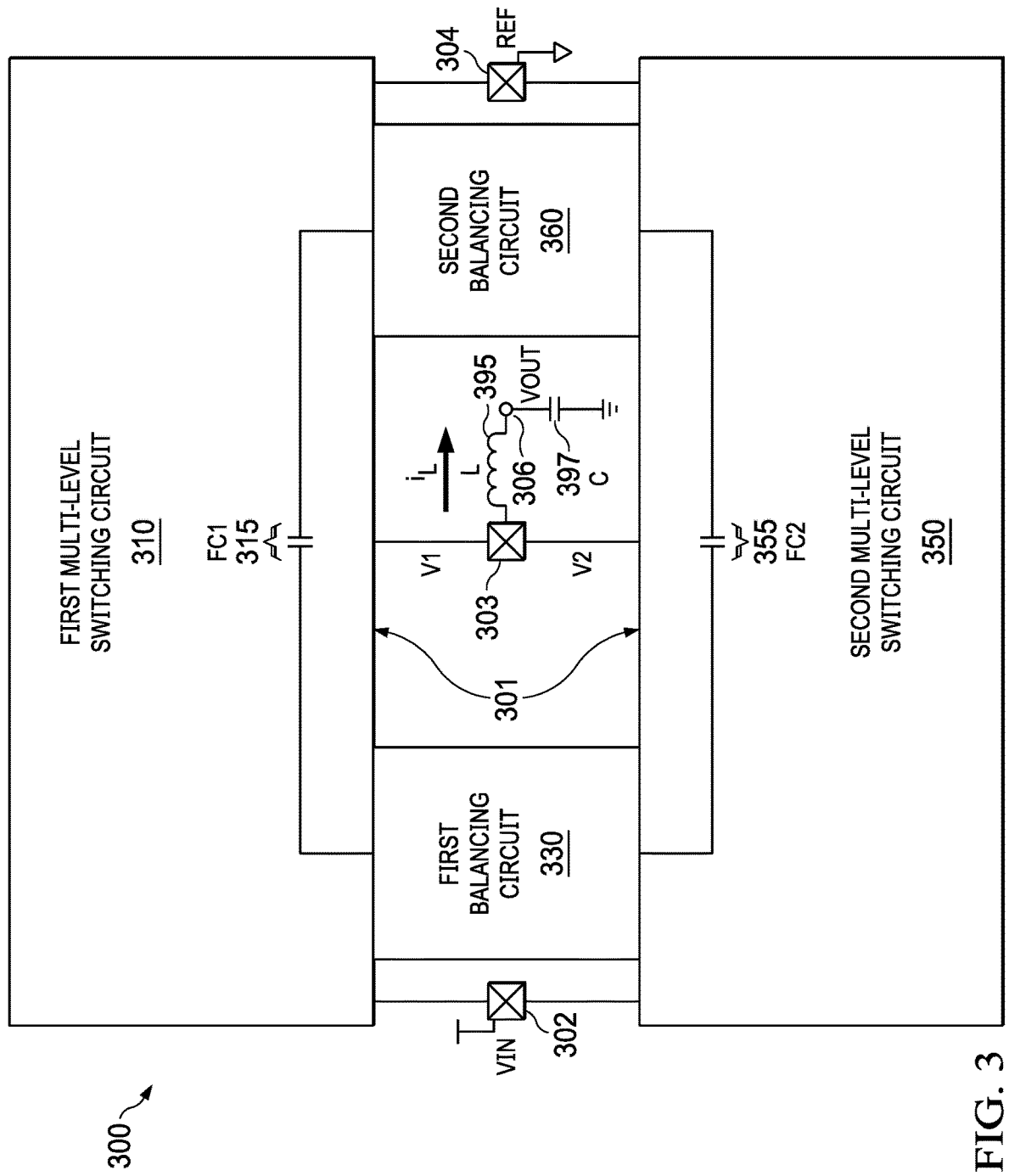
FIG. 3 is a block diagram of an interleaved multi-level converter, according to one aspect of this description.

FIG. 3 is a block diagram of a power conversion system 300 that includes an interleaved multi-level converter 301, and a first balancing circuit 330 and a second balancing circuit 360 that are controlled by a control circuit (not shown) to selectively connect a flying capacitor FC1 315 in a first multi-level switching circuit 310 in parallel with a flying capacitor FC2 355 in a second multi-level switching circuit 350. When the flying capacitors are coupled in parallel, after being series-coupled as dictated by switching stage commutation, the voltages across the flying capacitors are brought into equivalence with VIN/2 due to charge sharing.

Figure 4:
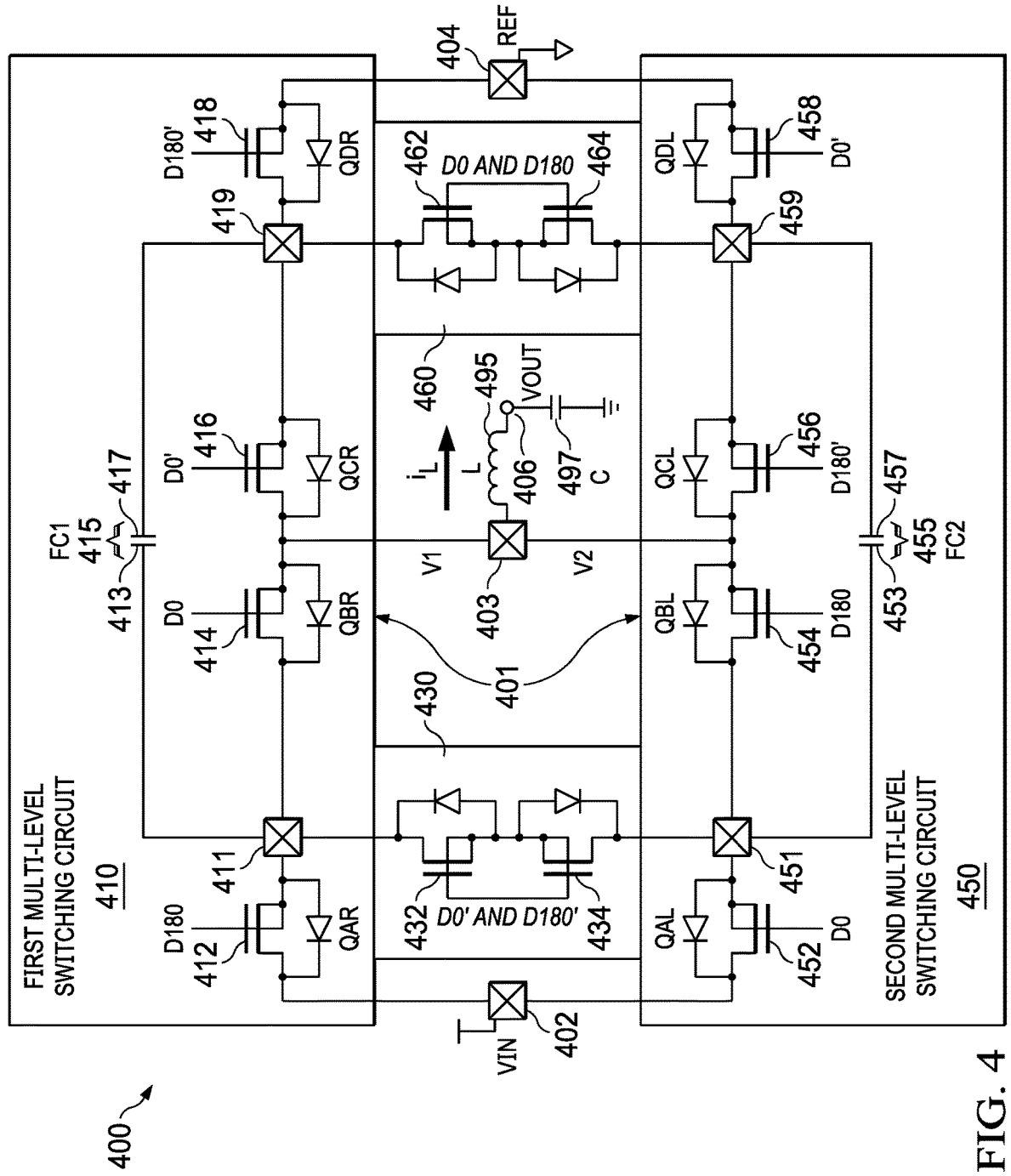
FIG. 4 is a circuit diagram of an interleaved multi-level converter, according to one aspect of this description.

FIG. 4 illustrates an example implementation of a power conversion system 400 that includes first multi-level switching circuit 410, second multi-level switching circuit 450, first balancing circuit 430, and second balancing circuit 460. The first balancing circuit 430 includes a first balancing switch 432 and a second balancing switch 434 arranged in series between a first internal node 411 and a first internal node 451. When both switches 432, 434 are closed, a high side plate 413 of flying capacitor 415 is coupled to a high side plate 453 of flying capacitor 455 to place the flying capacitors into a parallel circuit arrangement with one another. The first balancing switch 432 and the second balancing switch 434 are controlled by a logical AND operation of the switching control signals D0' and D180', so the high side plates of the flying capacitors 415, 455 are shorted only when both D180' and D0' overlap in high states. During this overlap interval, both switches 418 and 458 are turned ON, thereby placing the flying capacitors 415 and 455 in parallel circuit arrangement, as bottom plates 417, 457 are pulled to the REF node 404, and the top plates 413, 453 are shorted through switches 432, 434 in the first balancing circuit 430.

The second balancing circuit 460 includes a first balancing switch 462 and a second balancing switch 464 arranged in series between a second internal node 419 and a second internal node 459. When both switches 462, 464 are closed, a low side plate 417 of flying capacitor 415 is coupled to a low side plate 457 of flying capacitor 455, thereby placing the flying capacitors into a parallel circuit arrangement with one another. The first balancing switch 462 and the second balancing switch 464 are controlled by a result of a logical AND operation of the switching control signals D0 and D180, so the low side plates of the flying capacitors 415, 455 are shorted only when both D180 and D0 overlap in high states. During this overlap phase, both switches 412 and 452 are turned ON, thereby placing the flying capacitors 415, 455 in parallel circuit arrangement, as top plates 413, 452 are pulled to the input voltage at node 402, and the bottom plates 417, 457 are shorted through switches 462, 464 in the second balancing circuit 460. As shown in FIG. 4, the same switching control signals used to control the switches in the multi-level switching circuits 410, 450 are also used to control the balancing circuits 430, 460. This simplifies the design significantly.

FIGS. 5A-5D illustrate operation of an example power conversion system 500 during four intervals of a single switching period T when a duty cycle D of the switching control signals is less than 0.5 (a duty cycle of about 0.25 is shown). The power conversion system 500 includes an example interleaved multi-level converter 501 having balancing circuits 530, 560.

Figure 5A:
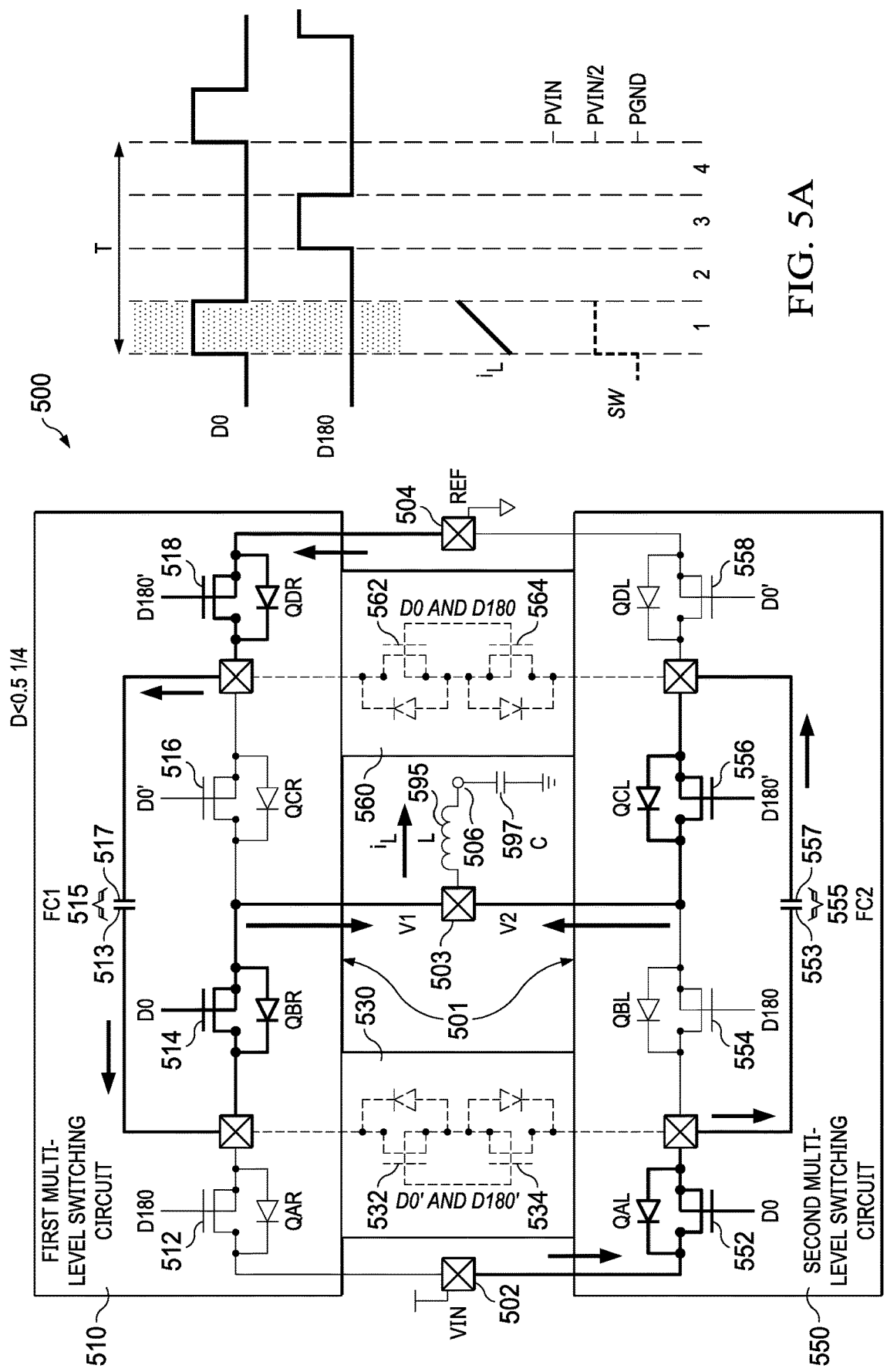
FIGS. 5A-5D are circuit diagrams illustrating operation of an example interleaved multi-level converter during four different switching conditions, according to one aspect of this description.

Referring to FIG. 5A, in a first interval, D0 is high, D180 is low, D0' is low, and D180' is high. (Only D0 and D180 are illustrated for simplicity). This combination of switching control signals will close switches 514 and 518 in the first multi-level switching circuit 510 and switches 552 and 556 in the second multi-level switching circuit 550. In this configuration, an input voltage VIN charges a flying capacitor 555 of the second multi-level switching circuit 550 to V2, which induces a current $I_L$ through an inductor 595 and to the load. The low side of flying capacitor 515 of the first multi-level switching circuit 510 is tied to the reference node 504, and a voltage across the flying capacitor 515 (V2) induces current $I_L$ through the inductor 595. Both the first balancing circuit 530 and the second balancing circuit 560 are inactive, because D0 and D180 (and D0' and D180') are not both high. During this interval, the flying capacitors 515, 555 are coupled in series circuit arrangement, with 555 coupled between the input node 502 and the switching node 503, and 515 coupled between the switching node 503 and the REF node 504.

Figure 5B:
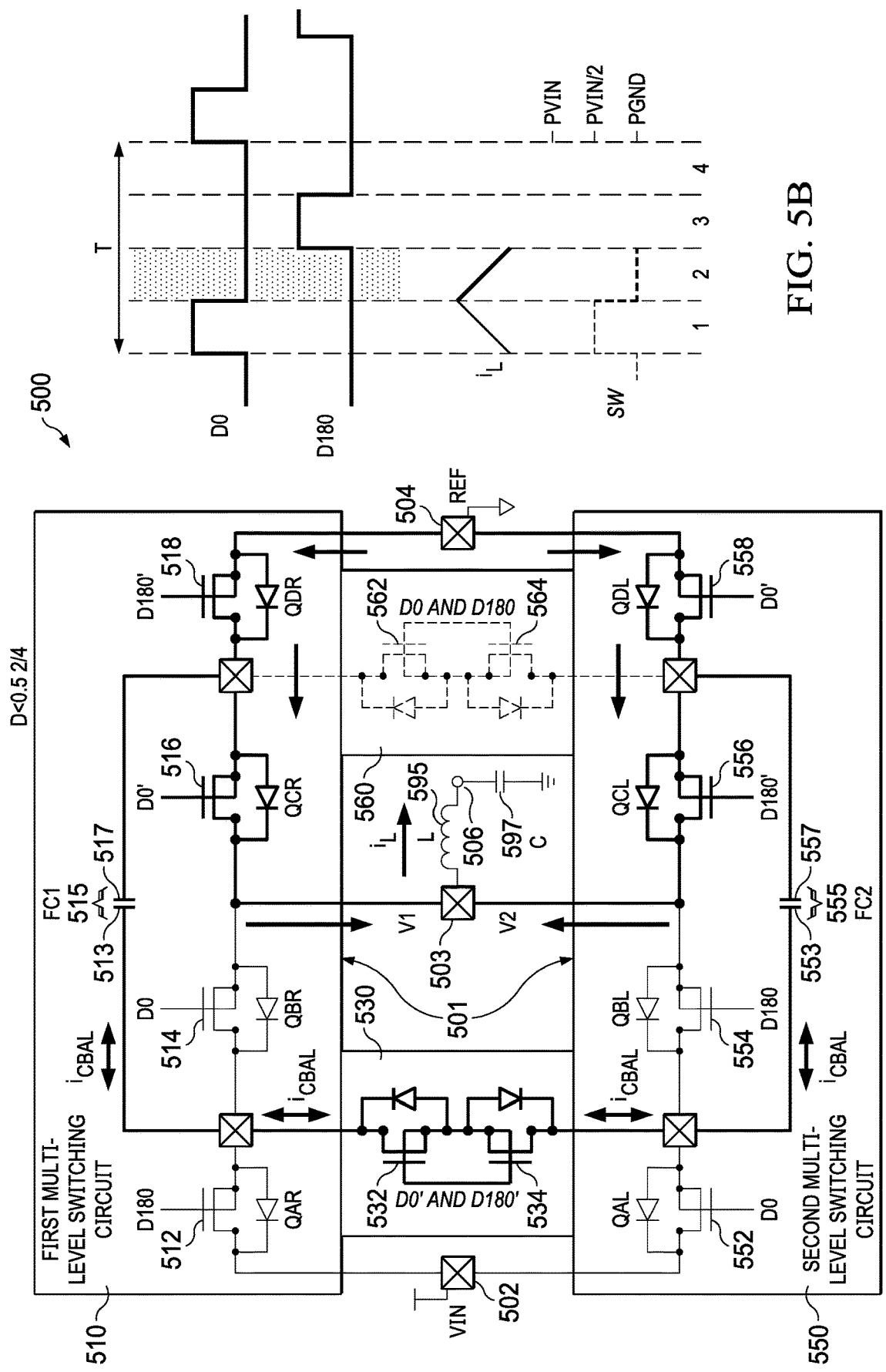

Referring to FIG. 5B, in a second interval, D0 and D180 are both low and D0' and D180' are both high. This combination of switching signals will close switches 516 and 518 in the first multi-level switching circuit 510 and switches 556 and 558 in the second multi-level switching circuit 550. First balancing circuit 530 is activated because both D0' and D180' are high, which closes both balancing switches 532, 534. In this configuration, current is drawn from the reference node through the closed switches to the inductor 595. A high side plate 513 of flying capacitor 515 is coupled to a high side plate 553 of flying capacitor 555, which places the flying capacitors into a parallel arrangement with one another, bringing the voltages $V_{FC1}$, $V_{FC2}$ across the flying capacitors into equivalence with one another at approximately VIN/2.

Figure 5C:
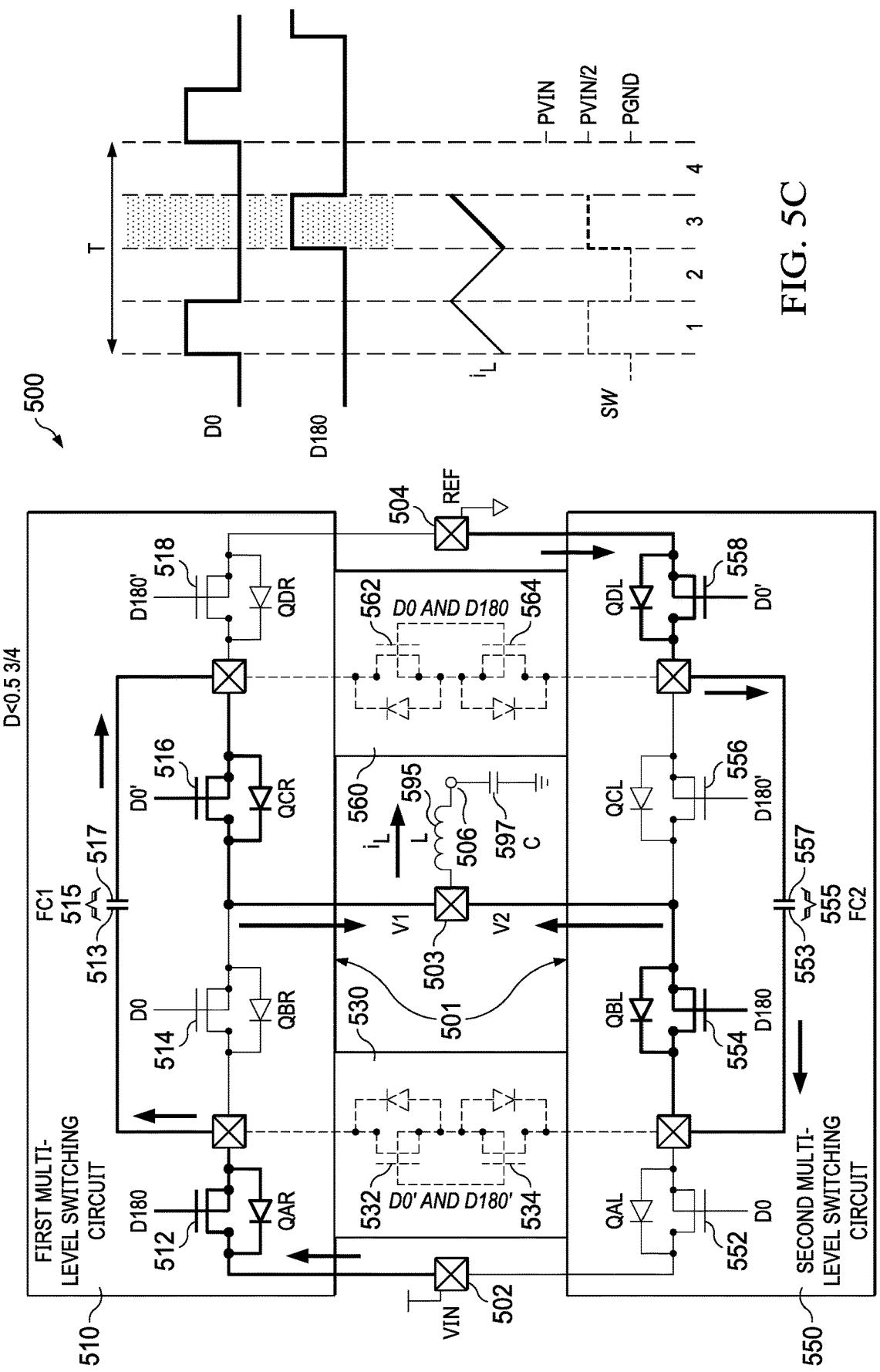

Referring to FIG. 5C, in a third interval, D0 is low, D180 is high, D0' is high, and D180' is low. This combination of switching control signals will close switches 512 and 516 in the first multi-level switching circuit 510 and switches 554 and 558 in the second multi-level switching circuit 550. In this configuration, an input voltage VIN charges the flying capacitor 515 of the first multi-level switching circuit 510 to V1, which induces a current $I_L$ through the inductor 595 and to the load. The low side of flying capacitor 555 of the second multi-level switching circuit 550 is tied to the reference node 504, and a voltage across the flying capacitor 555 (V2) induces current $I_L$ through the inductor 595. Both the first balancing circuit 530 and the second balancing circuit 560 are inactive because D0 and D180 (and D0" and D180') are not both high. During this interval, the flying capacitors 515, 555 are coupled in series circuit arrangement, with 515 coupled between the input node 502 and the switching node 503, and 555 coupled between the switching node 503 and the REF node 504.

Figure 5D:
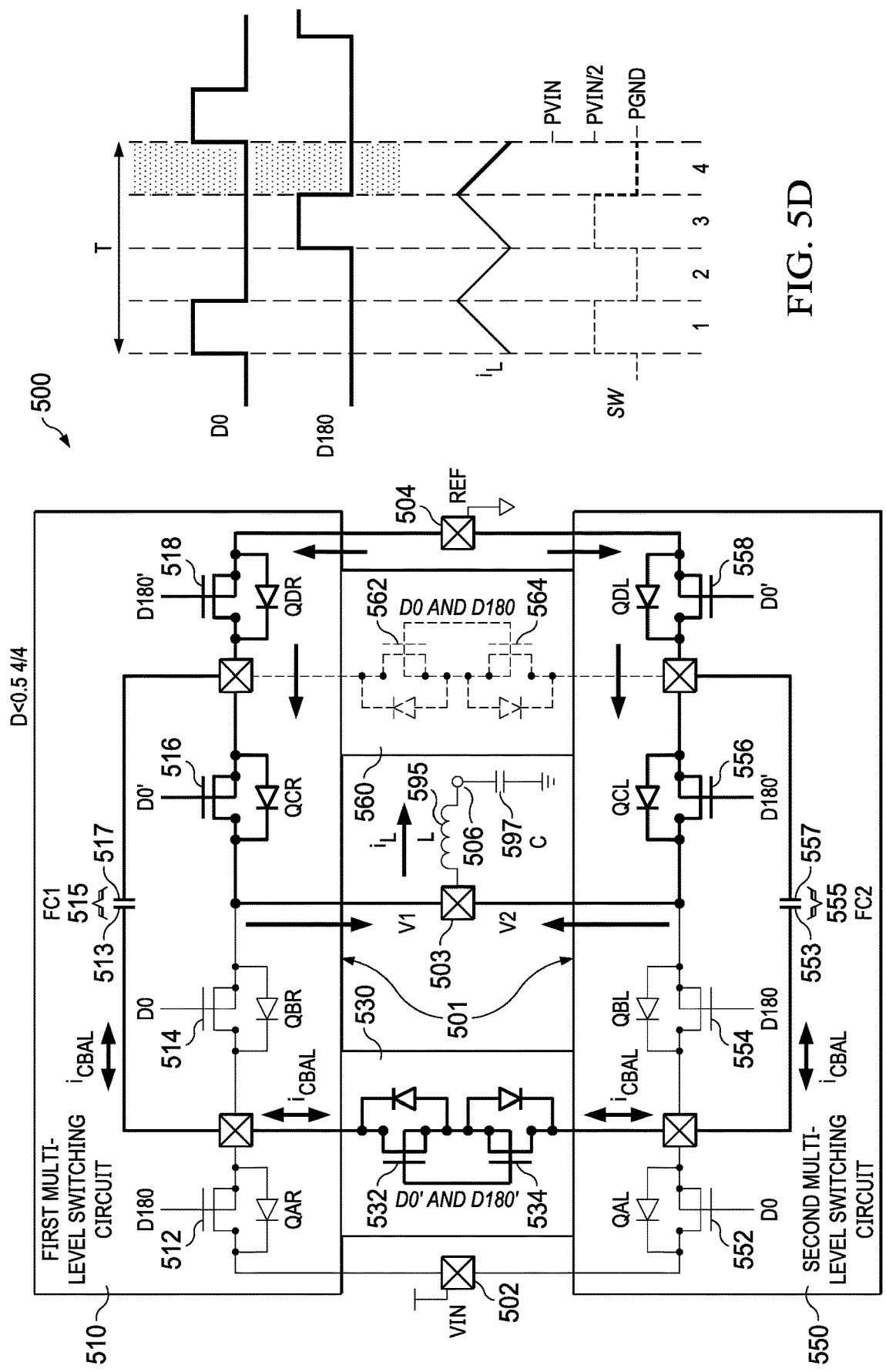

Referring to FIG. 5D, in a fourth interval, D0 and D180 are both low and D0' and D180' are both high. As described with reference to FIG. 5B, which illustrates the same switching control signal state, in this configuration, current is drawn from the reference node through the closed switches to the inductor 595. A high side plate 513 of flying capacitor 515 is coupled to a high side plate 553 of flying capacitor 555, which places the flying capacitors into a parallel arrangement with one another, bringing the voltages $V_{FC1}$, $V_{FC2}$ across the flying capacitors into equivalence with one another at approximately VIN/2.

As shown in FIGS. 5A-5D, when the duty cycle is less than 0.5, the first balancing circuit 530 is activated during two "overlap" intervals in the switching cycle during which both switching control signals D0' and D180' are high, so the flying capacitors 515 and 555 can "self balance." This balancing feature may be enabled or turned ON by default or might be activated selectively by the control circuitry, depending on the control scheme (e.g., peak or valley switching) and/or depending on monitored voltages across the flying capacitors 515, 555.

FIGS. 6A-6D illustrate operation of an example power conversion system 600 during four intervals of a single switching period T when a duty cycle D of the switching control signals is greater than 0.5 (a duty cycle of about 0.6 is shown). The power conversion system 600 includes an example interleaved multi-level converter 601 having balancing circuits 630, 660.

Figure 6A:
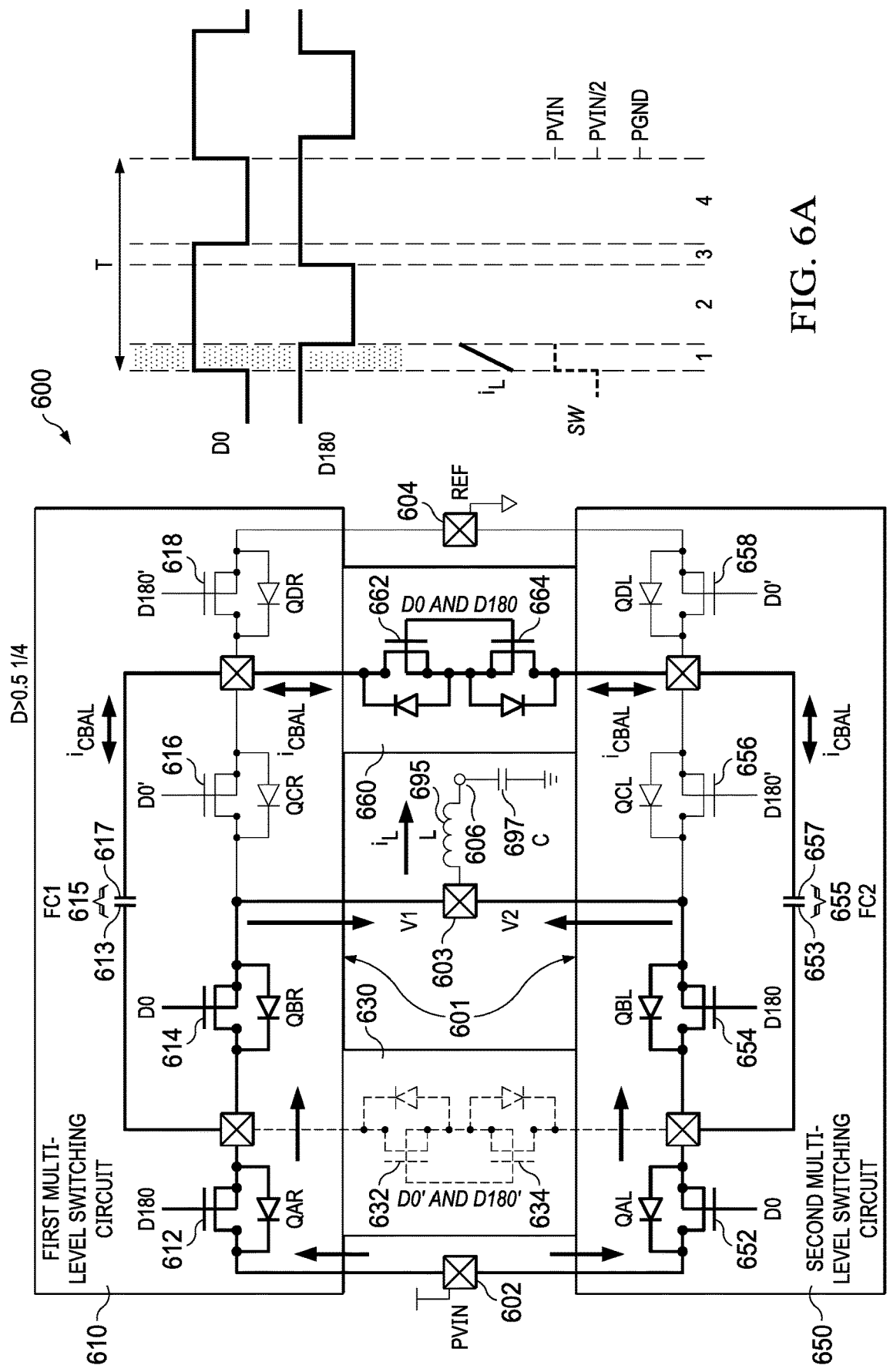
FIGS. 6A-6D are circuit diagrams illustrating operation of an example interleaved multi-level converter during four different switching conditions, according to one aspect of this description.

Referring to FIG. 6A, in a first interval, D0 and D180 are both high and D0' and D180' are both low. This combination of switching signals will close switches 612 and 614 in the first multi-level switching circuit 610 and switches 652 and 654 in the second multi-level switching circuit 650. Second balancing circuit 660 is activated because both D0 and D180 are high, which closes both balancing switches 662, 664. In this configuration, an input voltage VIN charges a flying capacitor 615 of the first multi-level switching circuitry 610 to V1 and also charges a flying capacitor 655 of the second multi-level switching circuit 650 to V2, which induces a current $I_L$ through the inductor 695 and to the load. A low side plate 617 of flying capacitor 615 is coupled to a low side plate 657 of flying capacitor 655, which places the flying capacitors into a parallel arrangement with one another, bringing the voltages $V_{FC1}$, $V_{FC2}$ across the flying capacitors into equivalence with one another at VIN/2.

Figure 6B:
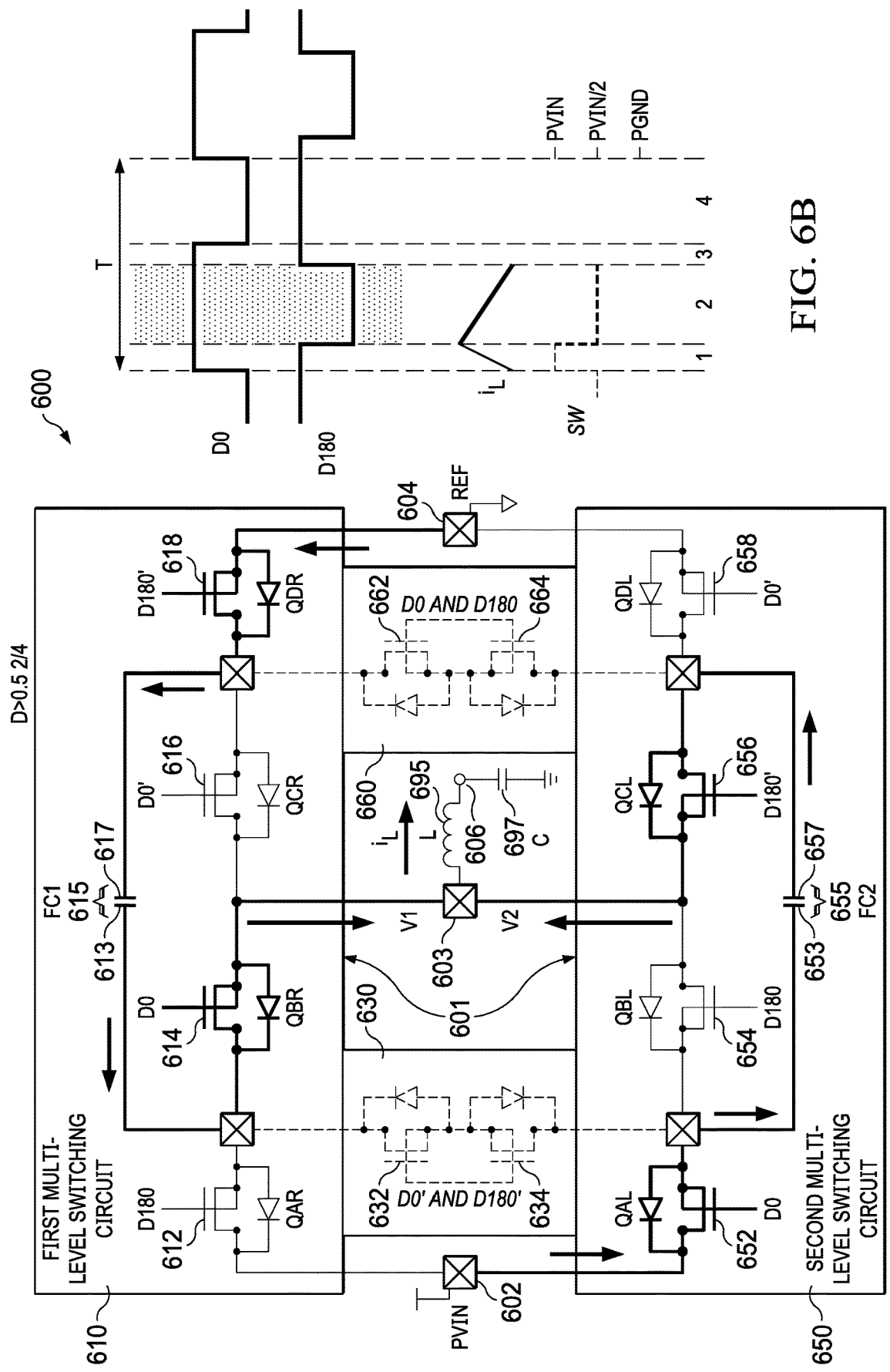

Referring to FIG. 6B, in a second interval, D0 is high, D180 is low, D0' is low, and D180' is high. This combination of switching control signals will close switches 614 and 618 in the first multi-level switching circuit 610 and switches 652 and 656 in the second multi-level switching circuit 650. In this configuration, an input voltage VIN charges a flying capacitor 655 of the second multi-level switching circuit 650 to V2, which induces a current $I_L$ through the inductor 695 and to the load. The low side of flying capacitor 615 of the first multi-level switching circuit 610 is tied to the reference node 604, and a voltage across the flying capacitor 615 (V2) induces current $I_L$ through the inductor 695. Both the first balancing circuit 630 and the second balancing circuit 660 are inactive because D0 and D180 (and D0 and D180') are not both high. During this interval, the flying capacitors 615, 655 are coupled in series circuit arrangement, with 655 coupled between the input node 602 and the switching node 603, and 615 coupled between the switching node 603 and the REF node 604.

Figure 6C:
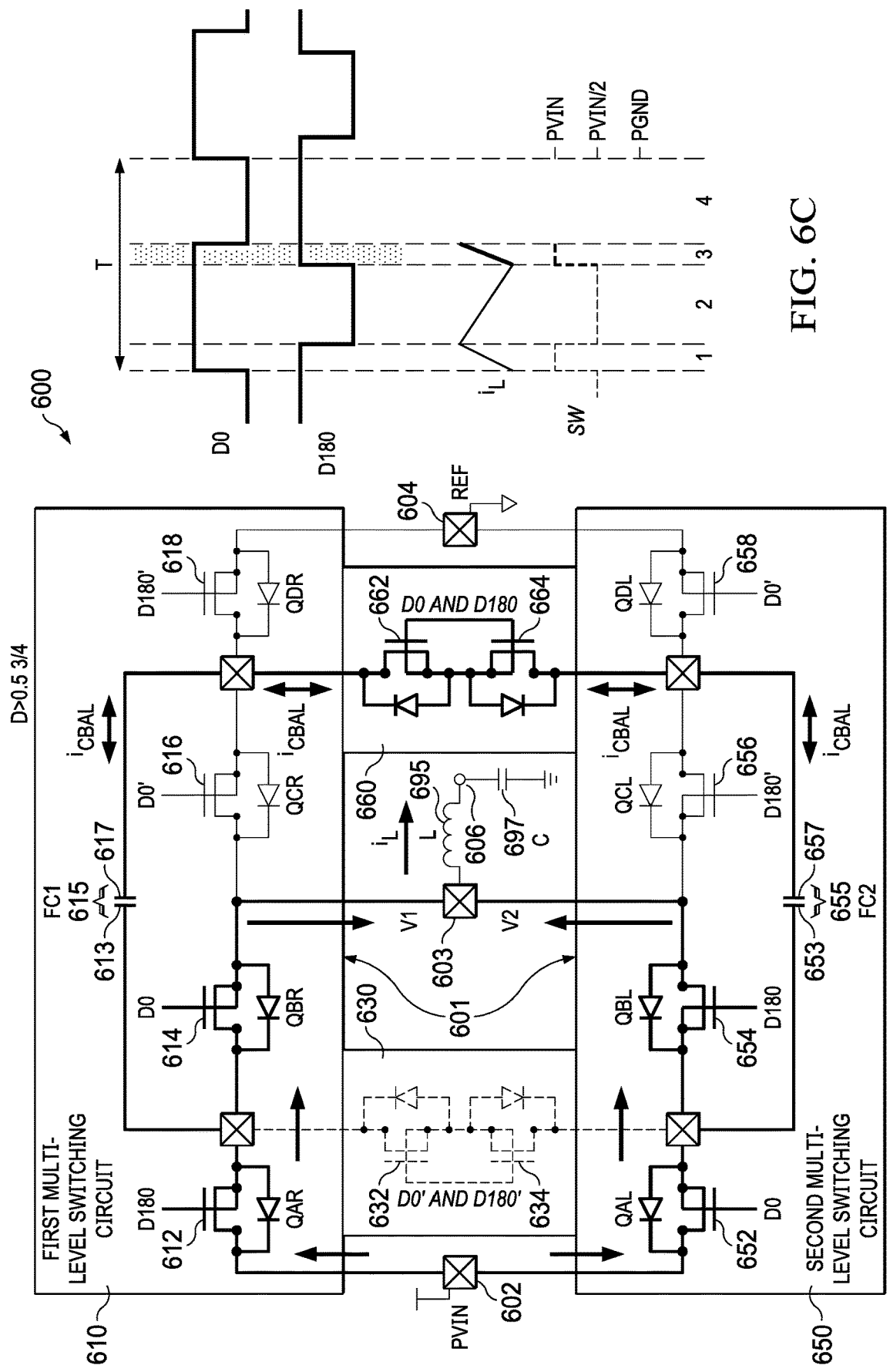

Referring to FIG. 6C, in a third interval, D0 and D180 are both high and D0' and D180' are both low. As described with reference to FIG. 6A, which illustrates the same switching control signal state, both flying capacitors 615, 655 are charged by VIN and induce a current through the inductor 695. A low side plate 617 of flying capacitor 615 is coupled to a low side plate 657 of flying capacitor 655, which places the flying capacitors into a parallel arrangement with one another, bringing the voltages $V_{FC1}$, $V_{FC2}$ across the flying capacitors into equivalence with one another at VIN/2.

Figure 6D:
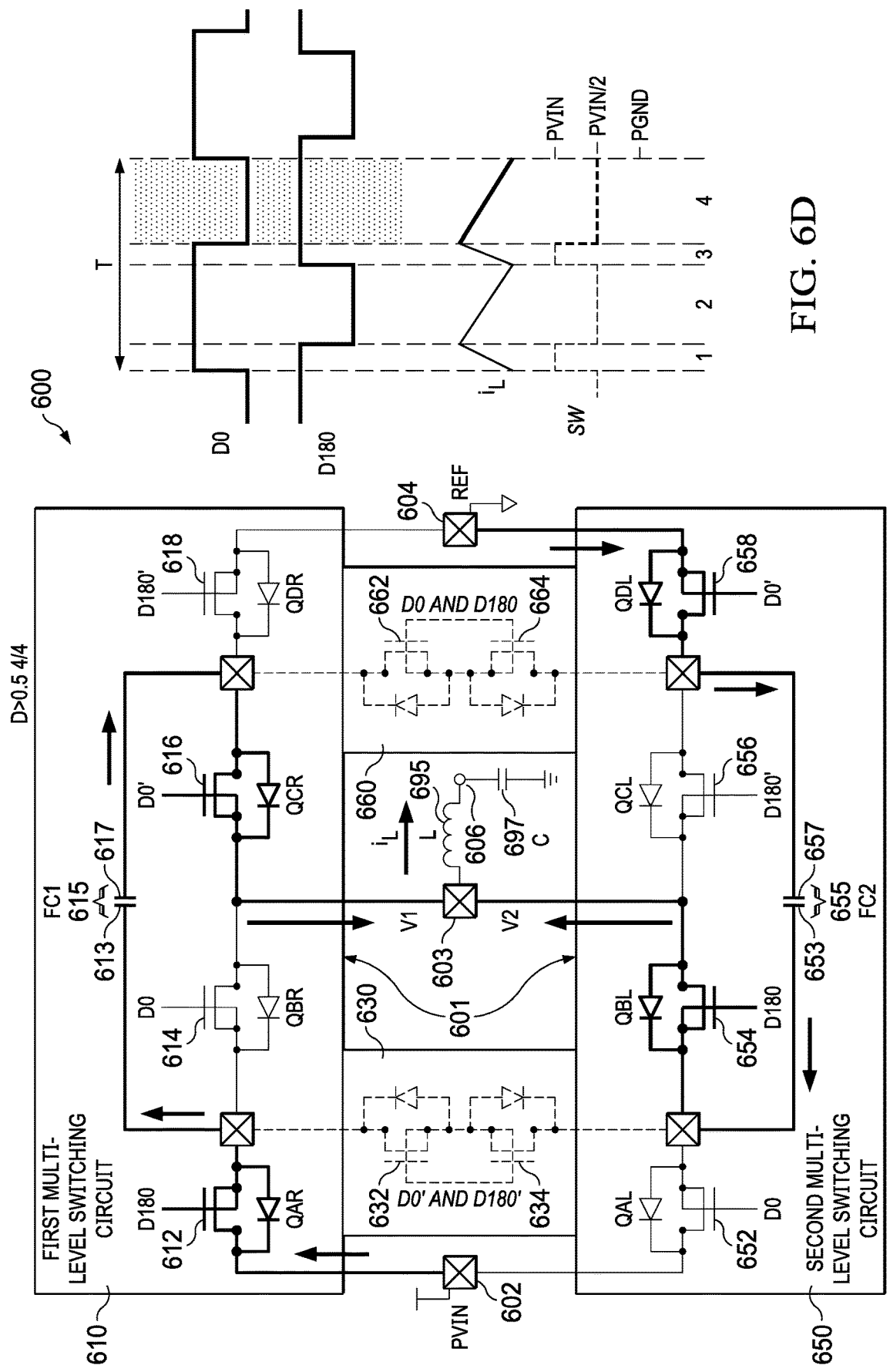

Referring to FIG. 6D, in a fourth interval, D0 is low, D180 is high, D0' is high, and D180' is low. This combination of switching control signals will close switches 612 and 616 in the first multi-level switching circuit 610 and switches 654 and 658 in the second multi-level switching circuit. In this configuration, an input voltage VIN charges the flying capacitor 615 of the first multi-level switching circuit 610 to V1, which induces a current $I_L$ through the inductor 695 and to the load. The low side of flying capacitor 655 of the second multi-level switching circuit 650 is tied to the reference node 604, and a voltage across the flying capacitor 655 (V2) induces current $I_L$ through the inductor 695. Both the first balancing circuit 630 and the second balancing circuit 660 are inactive because D0 and D180 (and D0' and D180') are not both high. During this interval, the flying capacitors 615, 655 are coupled in series circuit arrangement, with 615 coupled between the input node 602 and the switching node 603, and 655 coupled between the switching node 603 and the REF node 604.

As shown in FIGS. 6A-6D, when the duty cycle is greater than 0.5, the second balancing circuit 660 is activated during two "overlap" intervals in the switching cycle during which both switching control signals D0 and D180 are high, so the flying capacitors 615 and 655 can "self balance." This balancing feature may be enabled or turned ON by default or might be activated selectively by the control circuitry, depending on the control scheme (e.g., peak or valley switching) and/or depending on monitored voltages across the flying capacitors 615, 655.

Figure 7A:
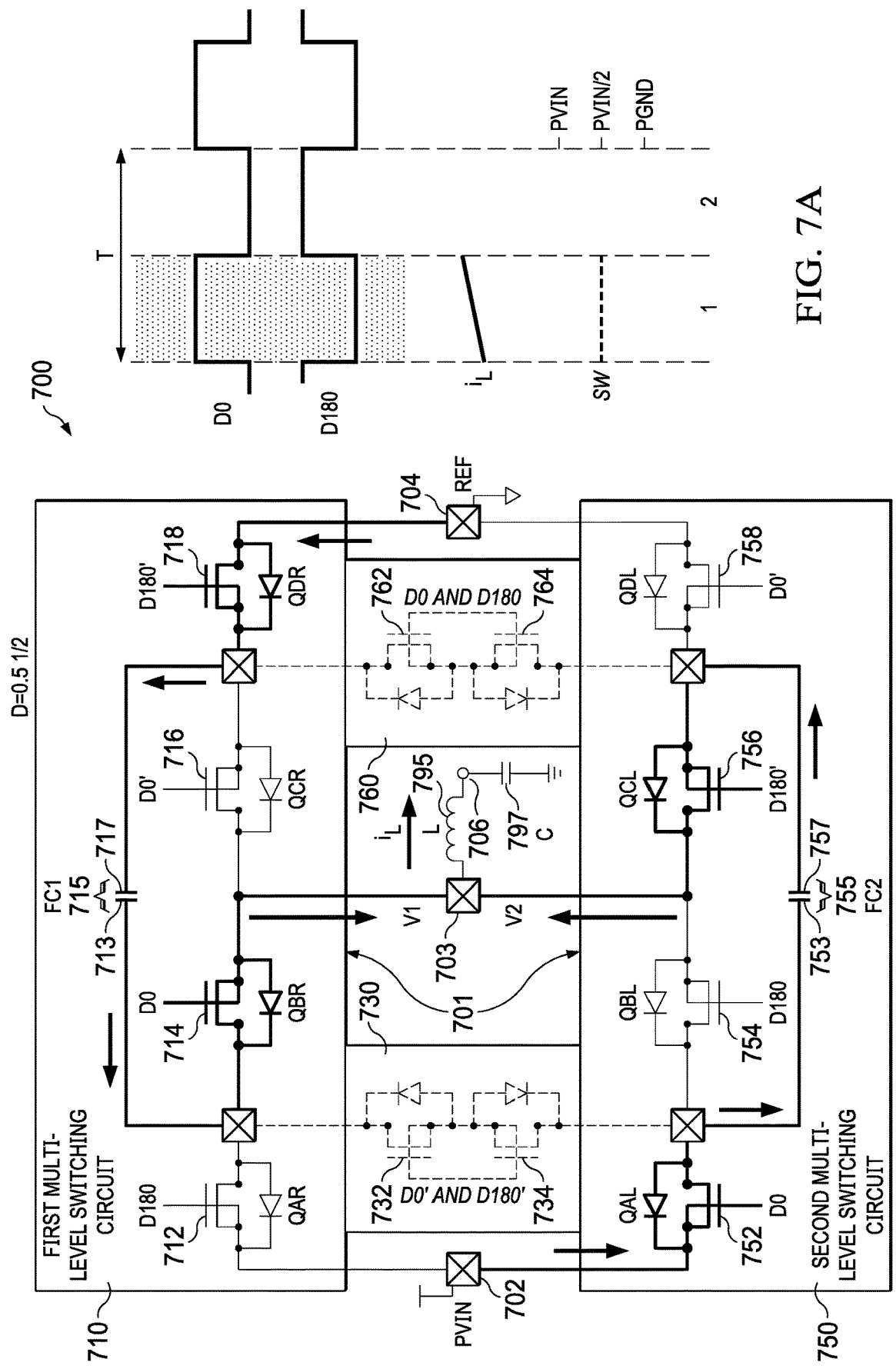
FIGS. 7A-7B are circuit diagrams illustrating operation of an example interleaved multi-level converter during two different switching conditions, according to one aspect of this description.
Figure 7B:
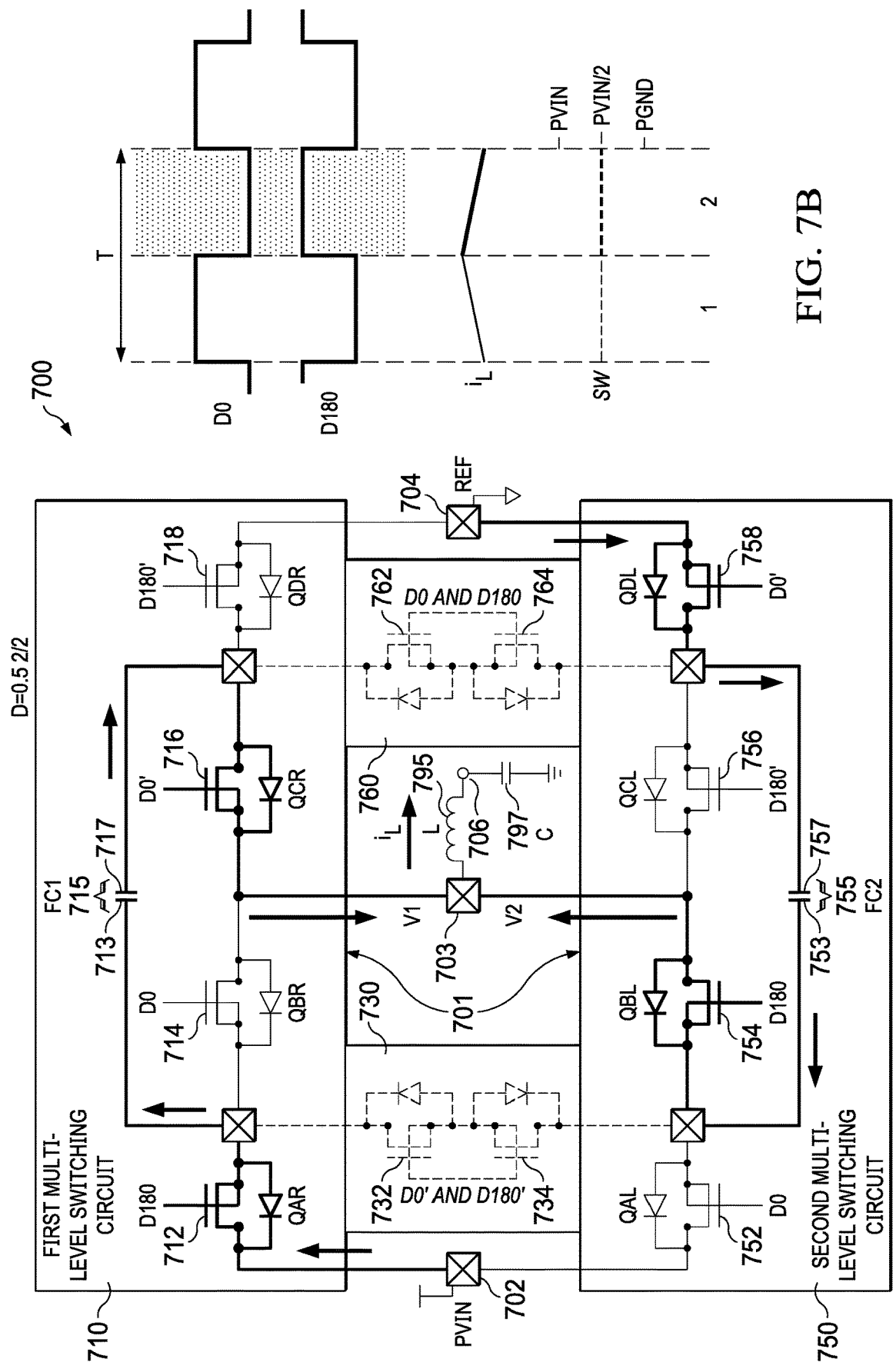

FIGS. 7A-7B illustrate operation of an example power conversion system 700 during two intervals of a single switching period T when a duty cycle D of the switching control signals is equal to 0.5. The power conversion system 700 includes an example interleaved multi-level converter 701 having balancing circuits 730, 760. Because the duty cycle is equal to 0.5, only two different switching signal states occur in which D0 and D180 have opposite values.

Referring to FIG. 7A, in a first interval, D0 is high, D180 is low, D0' is low, and D180' is high. This combination of switching control signals will close switches 714 and 718 in the first multi-level switching circuit 710 and switches 752 and 756 in the second multi-level switching circuit 750. In this configuration, an input voltage VIN charges a flying capacitor 755 of the second multi-level switching circuit 750 to V2, which induces a current $I_L$ through the inductor 795 and to the load. A low side 717 of flying capacitor 715 of the first multi-level switching circuit 710 is tied to the reference node 704, and a voltage across the flying capacitor 715 (V2) induces current $I_L$ through the inductor 795. Both the first balancing circuit 730 and the second balancing circuit 760 are inactive because D0 and D180 (and D0' and D180') are not both high. During this interval, the flying capacitors 715, 755 are coupled in series circuit arrangement, with 755 coupled between the input node 702 and the switching node 703, and 715 coupled between the switching node 703 and the REF node 704.

Referring to FIG. 7B, in a second interval, D0 is low, D180 is high, D0' is high, and D180' is low. This combination of switching control signals will close switches 712 and 716 in the first multi-level switching circuit 710 and switches 754 and 758 in the second multi-level switching circuit. In this configuration, an input voltage VIN charges the flying capacitor 715 of the first multi-level switching circuit 710 to V1, which induces a current $I_L$ through the inductor 795 and to the load. The low side of flying capacitor 755 of the second multi-level switching circuit 750 is tied to the reference node 704, and a voltage across the flying capacitor 755 (V2) induces current $I_L$ through the inductor 795. Both the first balancing circuit 730 and the second balancing circuit 760 are inactive because D0 and D180 (and D0" and D180') are not both high. During this interval, the flying capacitors 715, 755 are coupled in series circuit arrangement, with 715 coupled between the input node 702 and the switching node 703, and 755 coupled between the switching node 703 and the REF node 704.

As shown in FIGS. 7A-7B, when the duty cycle is equal to 0.5, no "overlap" interval exists in the switching cycle during which both switching control signals D0 and D180 or D0' and D180' are high, so the flying capacitors 715 and 755 will not be arranged in a parallel circuit for charge sharing and will not "self balance."

Several techniques may be used to address this lack of self-balancing when the duty cycle is equal to 0.5. For example, steps may be taken to ensure that the interleaved multi-level converter cannot be started in a duty cycle of 0.5. In another example, a transient may be introduced into the system at start up. In another example, switching control signals may be adjusted to address a potential voltage imbalance on the flying capacitors (not shown) caused by a duty cycle of 0.5.

Figure 8:
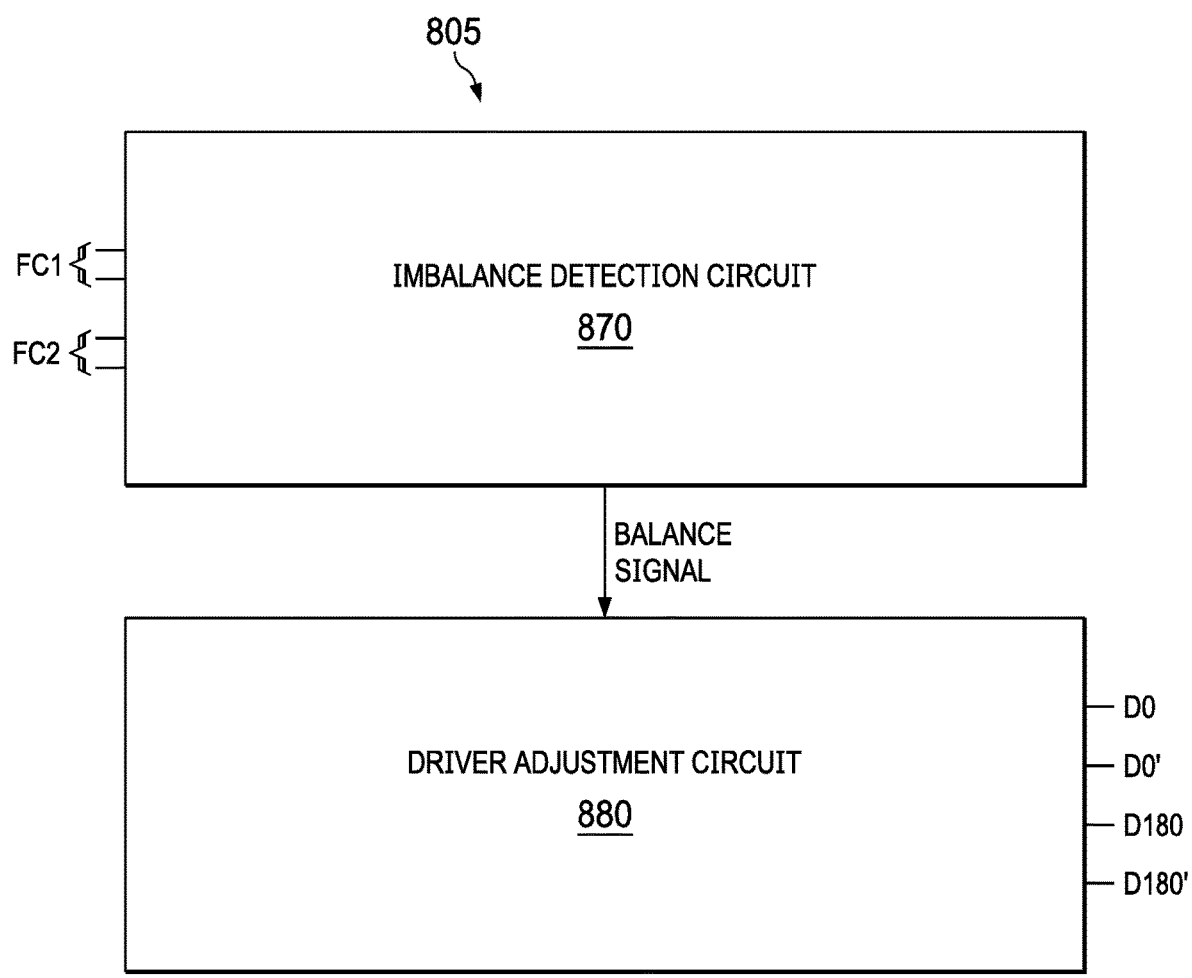
FIG. 8 is a block diagram of a control circuit for an interleaved multi-level converter, according to one aspect of this description.

FIG. 8 is a block diagram of a portion of an example control circuit 805 that generates the switching signals in a manner that prevents the voltage across flying capacitors in multi-level switching circuits from falling outside an equivalence range with VIN/2. The control circuit 805 includes an imbalance detection circuit 870 configured to determine whether a voltage across the flying capacitor in the first multi-level switching circuit or the flying capacitor in the second multi-level switching circuit falls outside an equivalence range with respect to half an input voltage at the input node. In response to determining that the voltage falls outside the equivalence range, the imbalance detection circuit 870 is configured to generate a balance signal. The control circuit 805 also includes a driver adjustment circuit configured to receive the balance signal and, in response to the balance signal, adjust a timing of at least one the switching control signals by an overlap duration (see FIG. 11) to cause both the first balancing switch and the second balancing switch to close during the resulting overlap interval.

Figure 9:
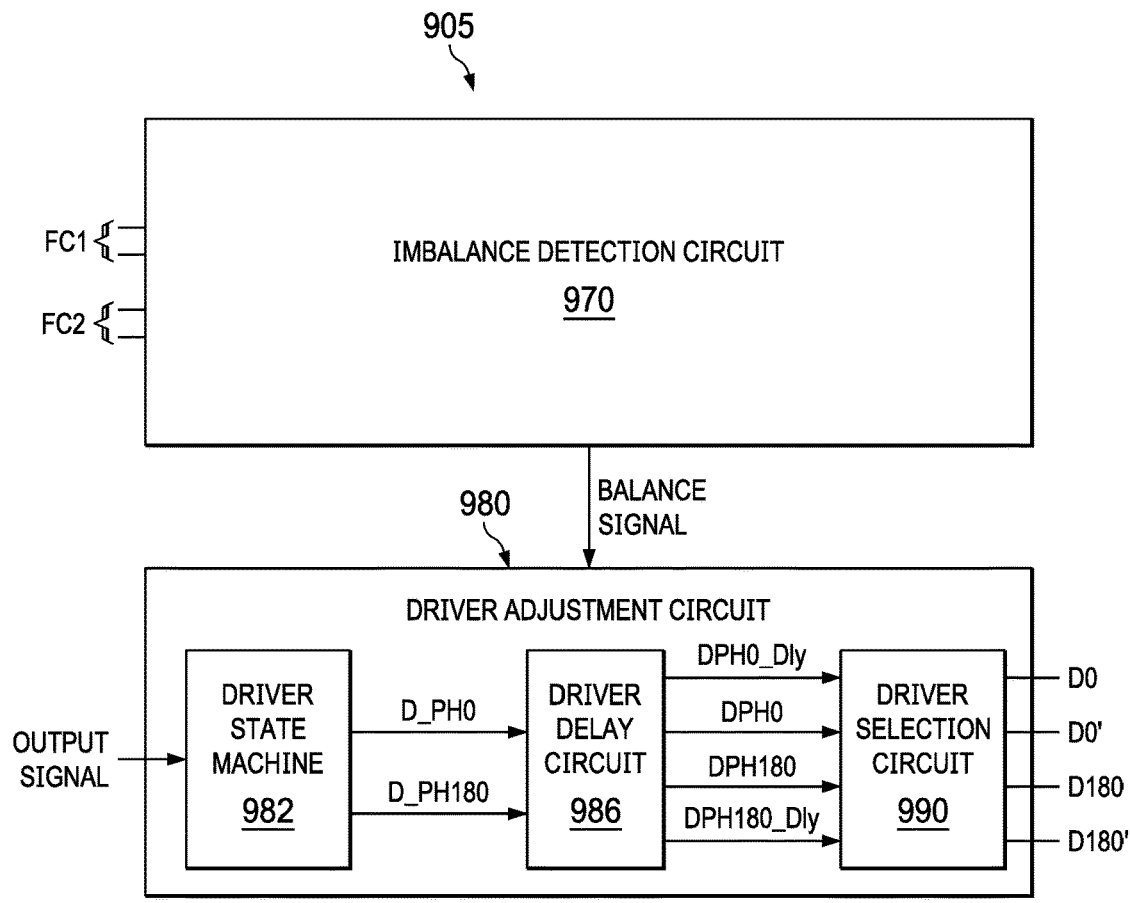
FIG. 9 is a block diagram of a control circuit for an interleaved multi-level converter, according to one aspect of this description.

FIG. 9 is a block diagram of a portion of an example control circuit 905 that generates the switching signals in a manner that maintains the voltage across flying capacitors in multi-level switching circuits within an equivalence range with VIN/2. The control circuit 905 includes an imbalance detection circuit 970 configured to determine whether a voltage across the flying capacitor in the first multi-level switching circuit or the flying capacitor in the second multi-level switching circuit falls outside an equivalence range with respect to half an input voltage at the input node. In response to determining that the voltage falls outside the equivalence range, the imbalance detection circuit 970 is configured to generate a balance signal. The control circuit 905 also includes a driver adjustment circuit 980 configured to receive the balance signal and, in response to the balance signal, adjust a timing of at least one the switching control signals by an overlap duration (see FIG. 11), so both the first balancing switch and the second balancing switch close during the overlap duration.

The driver adjustment circuit 980 includes a driver state machine 982 configured to determine a desired duty cycle based on an output signal or signals of a power conversion system (e.g., output voltage, inductor current, and so on). The driver state machine 982 generates switching control signals D_PH0 and D_PH180 that are 180 degrees out of phase with one another and exhibit the determined the duty cycle. A driver delay circuit 986 generates a delayed version of the switching control signals to generate DPH0_Dly and DPH180_Dly respectively. A driver selection circuit 990 selects either delayed or non-delayed version of a switching control signal (D0 in this example), depending on whether a balance signal has been generated by the imbalance detection circuit 970.

Figure 10:
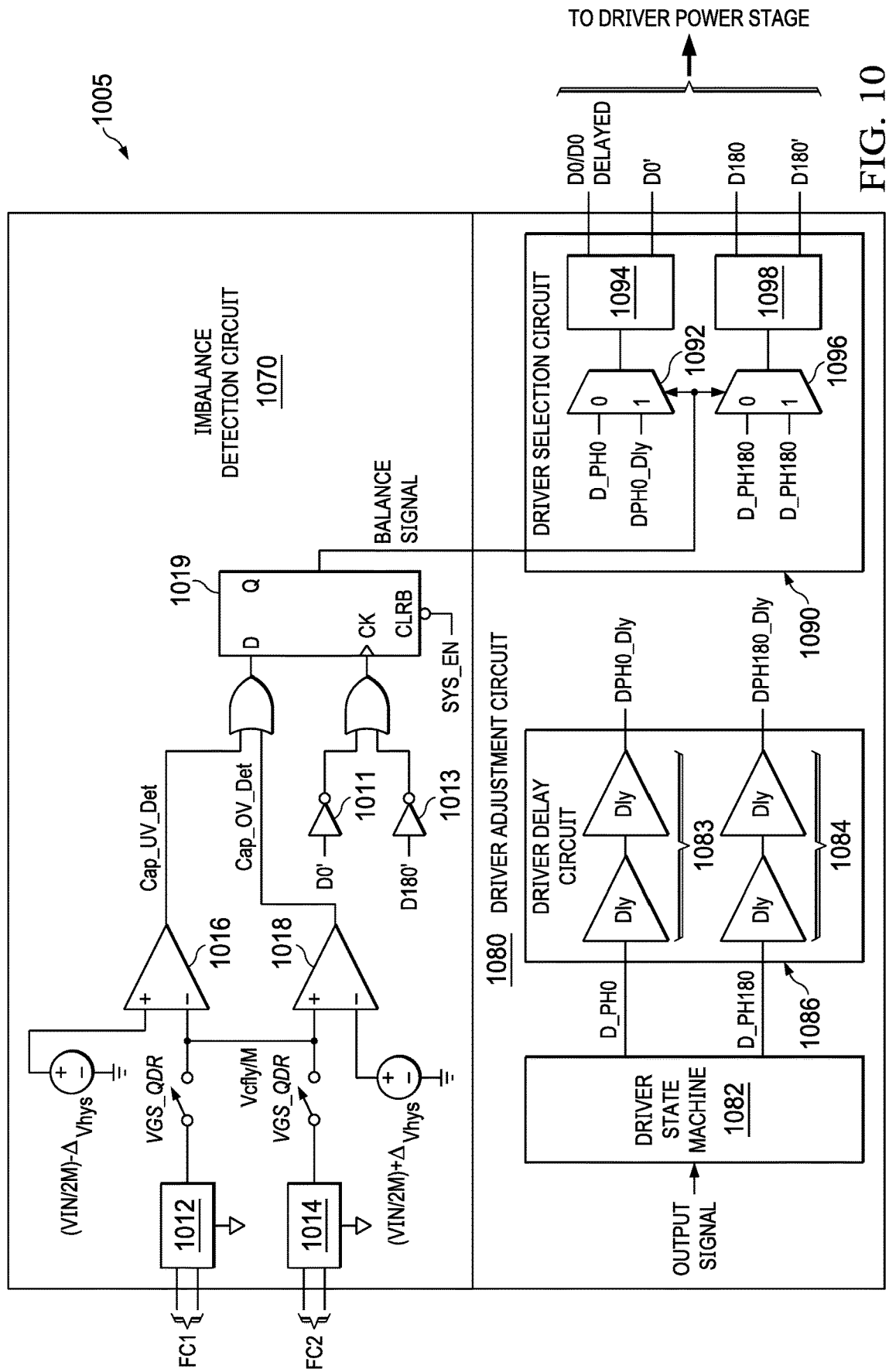
FIG. 10 is a schematic diagram of an example control circuit for an interleaved multi-level converter, according to one aspect of this description.

FIG. 10 is a block diagram of a portion of an example control circuit 1005 that generates the switching signals in a manner that maintains the voltage across flying capacitors in multi-level switching circuits within an equivalence range with VIN/2. The control circuit 1005 includes an imbalance detection circuit 1070 configured to determine whether a voltage across the flying capacitor in the first multi-level switching circuit or the flying capacitor in the second multi-level switching circuit falls outside an equivalence range with respect to half an input voltage at the input node. First and second voltage divider and clamps 1012, 1014 measure a voltage between top and bottom plates of flying capacitors in first and second multi-level switching circuits respectively. The measured voltages are provided to comparators 1016, 1018 when a fourth switch in the multi-level switching circuits (QDR, QDL in FIGS. 2-7) is closed, so a bottom plate of the flying capacitors is coupled to the reference voltage. These voltages are averaged, and the average is compared to VIN/2+/−$\Delta V_{hys}$ $\Delta V_{hys}$ defines an equivalence range about VIN/2. When comparator 1016 detects an under-voltage or comparator 1018 detects an over-voltage on the flying capacitors, a high value is stored in a latch 1019, which may be an edge-triggered flip flop. The latch 1019 is clocked by a logical OR combination of the outputs of inverters 1011 and 1013, which invert switching control signals D0' and D180' respectively. Thus, each time a logic LW to logic HIGH transition occurs on either of the D0 or D180 switching signals, the edge triggered flip flop 1019 samples the logical OR result of the over-voltage/under-voltage detection events and updates the balance signal accordingly. In this manner, whenever a flying capacitor over-voltage/under-voltage event occurs (so the flying capacitor voltages are moving away from VIN/2), the balance signal is set to logic HIGH.

The control circuit 1005 also includes a driver adjustment circuit 980 configured to receive the balance signal and, in response to the balance signal, adjust a timing of at least one the switching control signals by an overlap duration (see FIG. 11) to cause both the first balancing switch and the second balancing switch to close during the overlap duration. The driver adjustment circuit 1080 includes a driver state machine 1082 configured to determine a desired duty cycle based on an output signal of a power conversion system and generate switching control signals D_PH0 and D_PH180 that are 180 degrees out of phase with one another and exhibit the determined the duty cycle. A driver delay circuit 1086 includes buffers 1083 that delay switching control signal DPH0 to generate DPH0_Dly and buffers 1084 that delay switching control signal DPH180 to generate DPH180_Dly. The number of buffers may be controlled to achieve a desired overlap duration.

A driver selection circuit 1090 includes a first multiplexer 1092 that outputs either delayed switching control signal DPH0_Dly or non-delayed switching control signal D_PH0, depending on whether a balance signal is high. A second multiplexer 1096 has the non-delayed switching control signal DPH180 at both inputs. The path that includes buffers 1084 and multiplexer 1096 is provided to better synchronize the switching control signals DPH0, DPH0_Dly, and DPH180 for having passed through similar sets of components. Logic 1094 generates switching control signal D0 from the output of multiplexer 1092, which will be either the delayed or non-delayed version of DPH0. Logic 1094 also generates switching control signal D0' by inverting the selected switching control signal D0. Logic 1098 generates switching control signal D1800 D180 from the output of multiplexer 1092. Logic 1098 also generates switching control signal D180' by inverting switching control signal D180.

Figure 11:
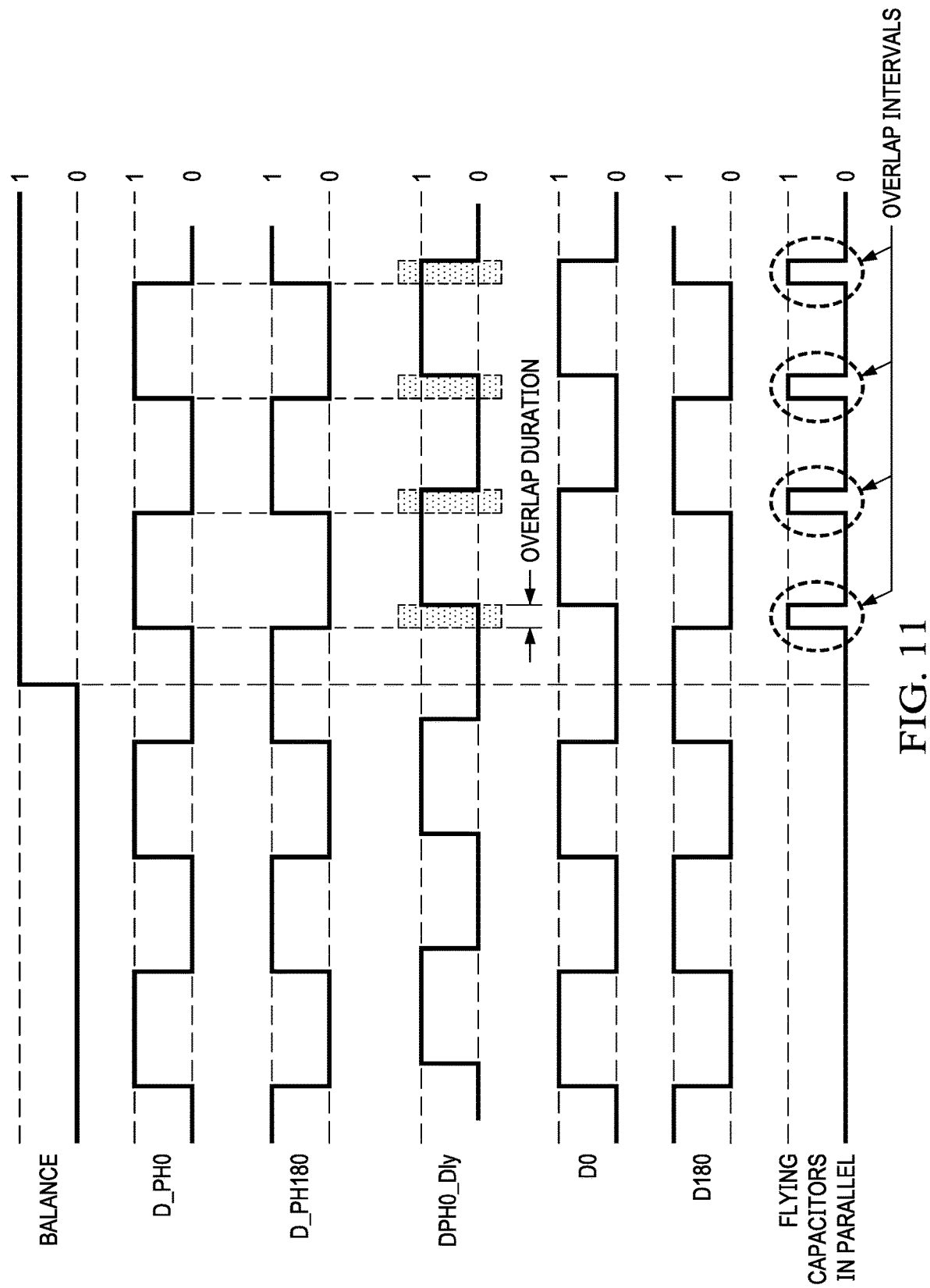
FIG. 11 is a timing diagram of signals generated by a control circuit for an interleaved multi-level converter, according to one aspect of this description.

FIG. 11 is a timing diagram of switching control signals D0 and D180 when the duty cycle is 0.5, and the duty cycle shifting technique described with reference to FIG. 10 is used to maintain the voltage across flying capacitors. When the Balance signal is high, the delayed switching control signal DPH0_Dly is output by the control circuit instead of the non-delayed switching control signal DPH0. This causes "overlap" intervals (shaded) in which both D0 and D180 are high or both D0 and D180 are low. When D0 and D180 have the same value, balancing circuits (e.g. 330 or 360, 430 or 490, 530 or 560, 630 or 660, 730 or 760 of FIGS. 3-7 respectively) are activated to place the flying capacitors in a parallel arrangement. This allows the flying capacitors to can self-balance when the duty cycle is 0.5.

Figure 12:
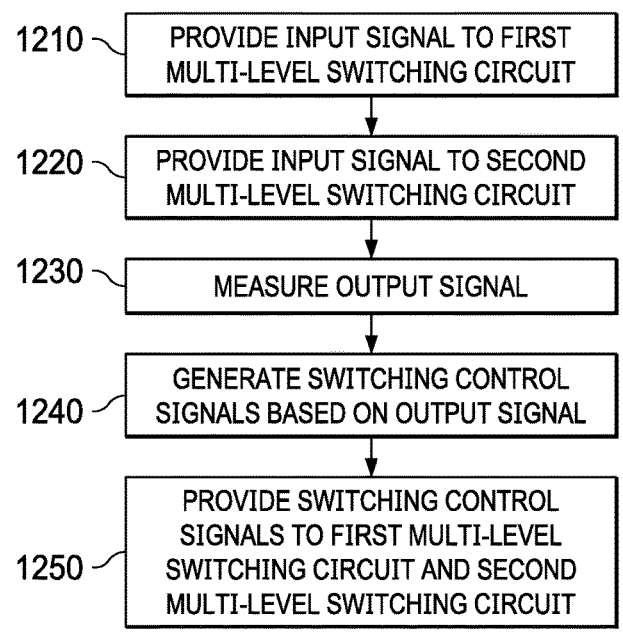
FIG. 12 is a flow diagram of an example method performed by a power conversion system or a controller, according to one aspect of this description.

FIG. 12 is a flow diagram outlining an example method 1200 to convert an input signal received at an input node into an output signal at an output node. The method 1200 may be performed by any of the power conversion systems 100, 200, 300, 400, 500, 600, 700, 800, 900, 1000 described above or by a controller that is configured to control the various components of the power conversion systems. The controller may be implemented as a processor or machine executing stored computer-executable instructions, hardware, firmware, and so on.

The method 1200 includes: at 1210, providing the input signal to a first multi-level switching circuit coupled to a switching node, the input node, and a reference node; and, at 1220, providing the input signal to a second multi-level switching circuit coupled to the switching node, the input node, and the reference node, so the second multi-level switching circuit is arranged in parallel with the first multi-level switching circuit. At 1230, an output signal is measured. The method includes, at 1240, generating, based on the output signal, switching control signals as pulse width modulated signals having a duty cycle to control the output signal. The switching control signals are provided to the first multi-level switching circuit and the second multi-level switching circuit at 1250.

As described above, an interleaved multi-level converter provides the benefits of a multi-level topology, autonomous balancing of flying capacitors, and elimination of the half switching frequency tone for conducted EMI.

The methods are illustrated and described above as a series of acts or events, but the illustrated ordering of such acts or events is not limiting. For example, some acts or events may occur in different orders and/or concurrently with other acts or events apart from those illustrated and/or described herein. Also, some illustrated acts or events are optional to implement one or more aspects or embodiments of this description. Further, one or more of the acts or events depicted herein may be performed in one or more separate acts and/or phases. In some embodiments, the methods described above may be implemented in a computer readable medium using instructions stored in a memory.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

Modifications are possible in the described examples, and other implementations are possible, within the scope of the claims.

What is claimed is:

1. A power conversion system comprising:
a first multi-level switching circuit including: a first switch having a first terminal defining an input node and having a second terminal defining a first internal node; a second switch having a respective first terminal coupled to the first internal node and having a respective second terminal defining a switching node; a third switch having a respective first terminal coupled to the switching node and having a respective second terminal defining a second internal node; a fourth switch having a respective first terminal coupled to the second internal node and having a respective second terminal defining a reference node; and a first flying capacitor coupled between the first and second internal nodes;
a second multi-level switching circuit including: a fifth switch having a respective first terminal coupled to the input node and having a respective second terminal defining a third internal node; a sixth switch coupled between the third internal node and the switching node; a seventh switch having a respective first terminal coupled to the switching node and having a respective second terminal defining a fourth internal node; an eighth switch coupled between the fourth internal node and the reference node; and a second flying capacitor coupled between the third and fourth internal nodes;
a balancing circuit including ninth and tenth switches coupled in series between the first and third internal nodes or coupled in series between the second and fourth internal nodes; and
a control circuit coupled to a respective control terminal of each of the first through tenth switches, the control circuit configured to provide switching control signals that are 180 degrees out of phase with each other to control closing of the ninth and tenth switches.

2. The power conversion system of claim 1, further comprising an inductor having a respective first terminal coupled to the switching node and having a respective second terminal defining an output node.

3. The power conversion system of claim 1, wherein the control circuit is configured to:
generate switching control signals including a first switching control signal, a second switching control signal that is 180 degrees out of phase with the first switching control signal, a third switching control signal that is an inversion of the first switching control signal, and a fourth switching control signal that is an inversion of the second switching control signal; and
provide respective switching control signals to respective switches in the first multi-level switching circuit and the second multi-level switching circuit, so:
switching control signals provided to the first switch in the first multi-level switching circuit and the fifth switch in the second multi-level switching circuit are 180 degrees out of phase with one another;
switching control signals provided to the second switch in the first multi-level switching circuit and the sixth switch in the second multi-level switching circuit are 180 degrees out of phase with one another;
switching control signals provided to the third switch in the first multi-level switching circuit and the seventh switch in the second multi-level switching circuit are 180 degrees out of phase with one another; and
switching control signals provided to the fourth switch in the first multi-level switching circuit and the eighth switch in the second multi-level switching circuit are 180 degrees out of phase with one another.

4. The power conversion system of claim 3, wherein the control circuit is configured to:
provide the first switching control signal to the second switch in the first multi-level switching circuit and the fifth switch in the second multi-level switching circuit;
provide the second switching control signal to the first switch in the first multi-level switching circuit and the sixth switch in the second multi-level switching circuit;
provide the third switching control signal to the third switch in the first multi-level switching circuit and the eighth switch in the second multi-level switching circuit; and
provide the fourth switching control signal to the fourth switch in the first multi-level switching circuit and the seventh switch in the second multi-level switching circuit.

5. The power conversion system of claim 1, wherein the balancing circuit is configured to selectively connect the first flying capacitor into a parallel circuit arrangement with the second flying capacitor.

6. The power conversion system of claim 5, wherein:
when the balancing circuit is coupled between the first and third internal nodes, the balancing circuit is configured to selectively connect a high side plate of the first flying capacitor to a high side plate of the second flying capacitor; and
when the balancing circuit is coupled between the second and fourth internal nodes, the balancing circuit is configured to selectively connect a low side plate of the first flying capacitor a low side plate of the second flying capacitor.

7. The power conversion system of claim 1, wherein the balancing circuit is a first balancing circuit coupled between the first and third internal nodes, and the power conversion system further comprising:
a second balancing circuit including eleventh and twelfth switches coupled in series between the second and fourth internal nodes;
wherein the ninth and tenth switches are switched ON by an overlap in value of respective switching control signals that are 180 degrees out of phase with one another; and
wherein the eleventh and twelfth switches are switched ON by an overlap in value of respective switching control signals that are 180 degrees out of phase with one another.

8. A power conversion system comprising:
a first multi-level switching circuit including: a first switch having a first terminal defining an input node and having a second terminal defining a first internal node; a second switch having a respective first terminal coupled to the first internal node and having a respective second terminal defining a switching node; a third switch having a respective first terminal coupled to the switching node and having a respective second terminal defining a second internal node; a fourth switch having a respective first terminal coupled to the second internal node and having a respective second terminal defining a reference node; and a first flying capacitor coupled between the first and second internal nodes;
a second multi-level switching circuit including: a fifth switch having a respective first terminal coupled to the input node and having a respective second terminal defining a third internal node; a sixth switch coupled between the third internal node and the switching node; a seventh switch having a respective first terminal coupled to the switching node and having a respective second terminal defining a fourth internal node; an eighth switch coupled between the fourth internal node and the reference node; and a second flying capacitor coupled between the third and fourth internal nodes;
a balancing circuit including ninth and tenth switches coupled in series between the first and third internal nodes or coupled in series between the second and fourth internal nodes; and
a control circuit coupled to a respective control terminal of each of the first through tenth switches, the control circuit including:
an imbalance detection circuit configured to: determine whether a voltage across the first flying capacitor or the second flying capacitor falls outside an equivalence range with respect to half an input voltage at the input node; and in response to determining that the voltage falls outside the equivalence range, generate a balance signal; and
a driver adjustment circuit configured to: in response to receiving the balance signal, adjust a timing of at least one switching control signal by an overlap duration to cause both the ninth and tenth switches to close during the overlap duration.

9. A method comprising:
providing an input signal to a first multi-level switching circuit coupled to a switching node, an input node, and a reference node;
providing the input signal to a second multi-level switching circuit coupled to the switching node, the input node, and the reference node, in which the second multi-level switching circuit is arranged in parallel with the first multi-level switching circuit;
measure an output signal at an output node of the multi-level converter;
generating, based on the output signal at the output node of the multi-level converter, switching control signals as pulse width modulated signals having a duty cycle to control the output signal;
providing the switching control signals to the first multi-level switching circuit and the second multi-level switching circuit; and
controlling a pair of switches to close to selectively connect a first flying capacitor in the first multi-level switching circuit into a parallel circuit arrangement with a second flying capacitor in the second multi-level switching circuit, the pair of switches coupled in series between the first multi-level switching circuit and the second multi-level switching circuit, in which the pair of switches are controlled to close using switching control signals that are 180 degrees out of phase with one another.

10. The method of claim 9, wherein each of the first multi-level switching circuit and the second multi-level switching circuit includes a first switch, a second switch, a third switch, and a fourth switch coupled in series between the input node and the reference node, wherein the switches are controlled by the switching control signals, and the method further comprising:
generating switching control signals including a first switching control signal, a second switching control signal that is 180 degrees out of phase with the first switching control signal, a third switching control signal that is an inversion of the first switching control signal, and a fourth switching control signal that is an inversion of the second switching control signal; and
providing switching control signals that are 180 degrees out of phase with one another to first switches in the first multi-level switching circuit and the second multi-level switching circuit;
providing switching control signals that are 180 degrees out of phase with one another to second switches in the first multi-level switching circuit and the second multi-level switching circuit;
providing switching control signals that are 180 degrees out of phase with one another to third switches in the first multi-level switching circuit and the second multi-level switching circuit; and
providing switching control signals that are 180 degrees out of phase with one another to fourth switches in the first multi-level switching circuit and the second multi-level switching circuit.

11. The method of claim 10, further comprising:
approving the first switching control signal to the second switch in the first multi-level switching circuit and the first switch in the second multi-level switching circuit;
providing the second switching control signal to the first switch in the first multi-level switching circuit and the second switch in the second multi-level switching circuit;
providing the third switching control signal to the third switch in the first multi-level switching circuit and the fourth switch in the second multi-level switching circuit; and
providing the fourth switching control signal to the fourth switch in the first multi-level switching circuit and the third switch in the second multi-level switching circuit.

12. The method of claim 9, wherein selectively connecting the first flying capacitor into a parallel circuit arrangement with the second flying capacitor includes connecting a high side plate of the first flying capacitor to a high side plate of the second flying capacitor.

13. The method of claim 9, wherein selectively connecting the first flying capacitor into a parallel circuit arrangement with the second flying capacitor includes connecting a low side plate of the first flying capacitor to a low side plate of the second flying capacitor.

14. A method comprising:
providing an input signal to a first multi-level switching circuit coupled to a switching node, an input node, and a reference node;
providing the input signal to a second multi-level switching circuit coupled to the switching node, the input node, and the reference node, in which the second multi-level switching circuit is arranged in parallel with the first multi-level switching circuit;
measure an output signal at an output node of the multi-level converter;
generating, based on the output signal at the output node of the multi-level converter, switching control signals as pulse width modulated signals having a duty cycle to control the output signal;
providing the switching control signals to the first multi-level switching circuit and the second multi-level switching circuit;
controlling first and second switches to close to selectively connect a first flying capacitor in the first multi-level switching circuit into a parallel circuit arrangement with a second flying capacitor in the second multi-level switching circuit, the first and second switch coupled in series between the first multi-level switching circuit and the second multi-level switching circuit:
determining whether a voltage across the first flying capacitor or the second flying capacitor falls outside an equivalence range with respect to half an input voltage at the input node; and
in response to determining that the voltage falls outside the equivalence range, adjust a timing of at least one the switching control signals by an overlap duration to cause both the first and the second switches to close during the overlap duration.

15. An integrated circuit, comprising:
a first multi-level switching circuit including: a first switch coupled having a first terminal defining an input node and having a second terminal defining a first capacitor coupling node; a second switch having a respective first terminal coupled to the first capacitor coupling node and having a respective second terminal defining a switching node; a third switch having a respective first terminal coupled to the switching node and having a respective second terminal defining a second capacitor coupling internal node; and a fourth switch having a respective first terminal coupled to the second capacitor coupling node and having a respective second terminal defining a reference node;
a second multi-level switching circuit including: a fifth switch having a respective first terminal coupled to the input node and having a respective second terminal defining a third capacitor coupling node; a sixth switch coupled between the third capacitor coupling node and the switching node; a seventh switch having a respective first terminal coupled to the switching node and having a respective second terminal defining a fourth capacitor coupling node; and an eighth switch coupled between the fourth capacitor coupling node and the reference node; and
a balancing circuit including ninth and tenth switches coupled in series between the first and third capacitor coupling nodes or coupled in series between the second and fourth capacitor coupling nodes, in which the ninth and tenth switches are configured to close responsive to switching control signals that are 180 degrees out of phase with each other.

16. The integrated circuit of claim 15, further comprising a control circuit coupled to a respective control terminal of each of the first through tenth switches.

17. The integrated circuit of claim 16, wherein the control circuit is configured to:
generate switching control signals including a first switching control signal, a second switching control signal that is 180 degrees out of phase with the first switching control signal, a third switching control signal that is an inversion of the first switching control signal, and a fourth switching control signal that is an inversion of the second switching control signal; and
provide respective switching control signals to respective switches in the first multi-level switching circuit and the second multi-level switching circuit, so:
switching control signals provided to the first switch in the first multi-level switching circuit and the fifth switch in the second multi-level switching circuit are 180 degrees out of phase with one another;
switching control signals provided to the second switch in the first multi-level switching circuit and the sixth switch in the second multi-level switching circuit are 180 degrees out of phase with one another;
switching control signals provided to the third switch in the first multi-level switching circuit and the seventh switch in the second multi-level switching circuit are 180 degrees out of phase with one another; and
switching control signals provided to the fourth switch in the first multi-level switching circuit and the eighth switch in the second multi-level switching circuit are 180 degrees out of phase with one another.

18. The integrated circuit of claim 16, wherein control circuit is configured to control the ninth and tenth switches with the switching control signals that are 180 degrees out of phase with one another.

19. The integrated circuit of claim 16, wherein the control circuit comprises:
an imbalance detection circuit configured to: determine whether a voltage across a first flying capacitor in the first multi-level switching circuit or a second flying capacitor in the second multi-level switching circuit falls outside an equivalence range with respect to half an input voltage at the input node; and in response to determining that the voltage falls outside the equivalence range, generate a balance signal; and
a driver adjustment circuit configured to: in response to receiving the balance signal, adjust a timing of at least one the switching control signals by an overlap duration to cause both the ninth and tenth switches to close during the overlap duration.

20. The integrated circuit of claim 15, further comprising:
a first flying capacitor coupled between the first and second capacitor coupling nodes; and
a second flying capacitor coupled between the third and fourth capacitor coupling nodes.

\* \* \* \* \*